United States Patent
Yan et al.

(10) Patent No.: US 12,363,546 B2
(45) Date of Patent: *Jul. 15, 2025

(54) SPATIAL REUSE INDICATION METHOD AND WIRELESS COMMUNICATIONS APPARATUS

(71) Applicant: HUAWEI TECHNOLOGIES CO., LTD., Guangdong (CN)

(72) Inventors: Zhongjiang Yan, Xi'an (CN); Mao Yang, Xi'an (CN); Yunbo Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/651,303

(22) Filed: Apr. 30, 2024

(65) Prior Publication Data

US 2024/0284183 A1    Aug. 22, 2024

Related U.S. Application Data

(63) Continuation of application No. 17/388,467, filed on Jul. 29, 2021, now Pat. No. 12,003,970, which is a
(Continued)

(30) Foreign Application Priority Data

Jan. 30, 2019    (CN) .......................... 201910092944.9

(51) Int. Cl.
*H04W 16/02*      (2009.01)
*H04W 72/044*     (2023.01)

(52) U.S. Cl.
CPC ......... *H04W 16/02* (2013.01); *H04W 72/046* (2013.01)

(58) Field of Classification Search
CPC .............. H04W 16/02; H04W 72/046; H04W 74/0816; H04W 74/002; H04W 24/02; H04W 72/51; H04L 5/00; H04L 5/0048
See application file for complete search history.

(56) References Cited

U.S. PATENT DOCUMENTS 8,204,028 B2     6/2012   Kessleman
9,749,964 B2 *   8/2017   Huang .............. H04W 74/0816
(Continued)

FOREIGN PATENT DOCUMENTS

CN     102740419 A    10/2012
CN     106603211 A    10/2012
(Continued)

OTHER PUBLICATIONS

IEEE P802.11ax/D3.0, "IEEE Draft Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications Amendment Enhancements for High Efficiency WLAN," Jun. 2018, 682 pages.
(Continued)

*Primary Examiner* — Kouroush Mohebbi
(74) *Attorney, Agent, or Firm* — Fish & Richardson P.C.

(57) ABSTRACT

Embodiments of this application disclose a spatial reuse indication method and a wireless communications apparatus, thereby reducing a quantity of nodes that can participate in spatial reuse, reducing mutual interference between nodes in spatial reuse, and improving spatial reuse system performance. The method in some implementations includes a first access point generates a spatial reuse limitation indication and a spatial reuse group indication. The spatial reuse limitation indication can be used to indicate whether only a node in a spatial reuse group is allowed for spatial reuse and to indicate the spatial reuse group. The spatial reuse group
(Continued)

includes one or more basic service sets. The first access point sends the spatial reuse limitation indication and the spatial reuse group indication.

20 Claims, 14 Drawing Sheets

Related U.S. Application Data continuation of application No. PCT/CN2020/072200, filed on Jan. 15, 2020.

(56) References Cited

U.S. PATENT DOCUMENTS

| | | | | |
|---|---|---|---|---|
| 9,794,790 | B2 * | 10/2017 | Huang | H04L 5/0062 |
| 10,366,064 | B2 * | 7/2019 | Cariou | G09G 5/393 |
| 10,498,697 | B2 * | 12/2019 | Cariou | H04W 74/0808 |
| 10,827,359 | B2 | 11/2020 | Cherian | |
| 11,997,712 | B2 * | 5/2024 | Lv | H04B 17/318 |
| 2005/0047384 | A1 | 3/2005 | Wax et al. | |
| 2016/0233940 | A1 * | 8/2016 | Huang | H04L 5/0092 |
| 2017/0230837 | A1 | 8/2017 | Huang | |
| 2018/0376467 | A1 | 12/2018 | Patil et al. | |
| 2019/0021007 | A1 | 1/2019 | Zhou | |
| 2019/0327741 | A1 | 10/2019 | Li | |

FOREIGN PATENT DOCUMENTS

| | | |
|---|---|---|
| CN | 106879004 A | 6/2017 |
| CN | 106961733 A | 7/2017 |
| CN | 108012278 A | 5/2018 |
| CN | 108271263 A | 7/2018 |
| CN | 108811161 A | 11/2018 |
| CN | 109245851 A | 1/2019 |
| WO | 2017067176 A1 | 4/2017 |
| WO | 2018121177 A1 | 7/2018 |
| WO | 2018164711 A1 | 9/2018 |

OTHER PUBLICATIONS

Office Action issued in Chinese Application No. 201910092944.9 on Apr. 26, 2022, 8 pages.

PCT International Search Report and Written Opinion issued in International Application No. PCT/CN2020/072200 on Apr. 13, 2020, 13 pages (with English translation).

* cited by examiner

SPATIAL REUSE INDICATION METHOD AND WIRELESS COMMUNICATIONS APPARATUS

CROSS-REFERENCE TO RELATED APPLICATIONS

This application is a continuation of U.S. patent application Ser. No. 17/388,467, filed on Jul. 29, 2021, which is a continuation of International Application No. PCT/CN2020/072200, filed on Jan. 15, 2020, which claims priority to Chinese Patent Application No. 201910092944.9, filed on Jan. 30, 2019. All of the afore-mentioned patent applications are hereby incorporated by reference in their entireties.

TECHNICAL FIELD

This application relates to the field of wireless communication technologies, and in particular, to a spatial reuse indication method and a wireless communications apparatus.

BACKGROUND

In the future, a wireless network has a trend of highly density deployment. In other words, a large quantity of wireless access devices and a large quantity of wireless terminal devices exist within a limited geographical range or a unit geographical range. In the foregoing highly density deployment scenario, because the large quantity of wireless access devices and the large quantity of wireless terminal devices exist, a network throughput required in the highly density deployment scenario is huge. As a result, a network throughput for the wireless access devices is insufficient. Consequently, normal communication between the wireless access device and the wireless terminal device cannot be ensured.

A spatial reuse (SR) technology is introduced into the next-generation wireless local area network (WLAN) standard revision (IEEE 802.11ax), to improve the network throughput in the highly density deployment scenario, thereby resolving a problem that the network throughput for the wireless access devices is insufficient in the highly density deployment scenario.

Specifically, an SR mechanism based on a spatial reuse parameter (SRP) and an SR mechanism based on overlapping basic service set power detection (OBSS_PD) are introduced into the IEEE 802.11ax standard. In the foregoing two SR mechanisms, mutual interference between SR stations is relatively large, thereby reducing SR system performance.

SUMMARY

Embodiments of this application provide a spatial reuse indication method and a wireless communications apparatus, to limit a range of nodes in spatial reuse to a node in a spatial reuse group, thereby reducing a quantity of nodes in spatial reuse, reducing mutual interference between nodes in spatial reuse, and improving spatial reuse system performance.

To achieve the foregoing technical objectives, the embodiments of this application provide the following technical solutions:

According to a first aspect, an embodiment of this application provides a spatial reuse indication method, including: A first access point generates a spatial reuse limitation indication and a spatial reuse group indication. The spatial reuse limitation indication is used to indicate whether only a node in a spatial reuse group is allowed for spatial reuse. The spatial reuse group indication is used to indicate the spatial reuse group. The spatial reuse group includes one or more basic service sets. Herein, "more" indicates two or more. Further, the first access point sends the spatial reuse limitation indication and the spatial reuse group indication. Optionally, the node is a station in a broad sense. The node may include a station (STA) and an access point (AP).

It can be learned from the technical solutions of the first aspect that this application has the following advantages: The spatial reuse group is introduced, and the spatial reuse limitation indication is used to limit a range of nodes in spatial reuse, so that the range of nodes in spatial reuse can be limited to a node in a basic service set belonging to the spatial reuse group, thereby finally reducing a quantity of nodes in spatial reuse, reducing mutual interference between the nodes in spatial reuse, and improving spatial reuse system performance.

In a possible implementation, if the spatial reuse limitation indication is a first value, it indicates that only the node in the spatial reuse group is allowed for spatial reuse, and a node outside the spatial reuse group is not allowed for spatial reuse, that is, the range of nodes in spatial reuse is limited by the spatial reuse group; or if the spatial reuse limitation indication is a second value, it indicates that a node allowed for spatial reuse is not limited by the spatial reuse group, that is, when the station performs spatial reuse, the station does not need to consider whether the spatial reuse group exists, or does not need to consider whether the station is in the spatial reuse group or outside the spatial reuse group. Being not limited by the spatial reuse group may be understood as performing spatial reuse according to an existing spatial reuse method in 802.11ax. Therefore, it may also be described as follows: If the spatial reuse limitation indication is the second value, it indicates that all nodes in an overlapping basic service set can perform spatial reuse based on a spatial reuse parameter. It may be further described as follows: If the spatial reuse limitation indication is the second value, it indicates that the node in the spatial reuse group and the node outside the spatial reuse group can both perform spatial reuse based on the spatial reuse parameter.

In a possible implementation, the spatial reuse limitation indication includes one bit. A first value corresponding to the bit is 1, and a second value corresponding to the bit is 0. It can be learned from this implementation that obtaining the spatial reuse limitation indication in the indication manner by using one bit can effectively save transmission resources, and can also facilitate flexibly configuring the spatial reuse limitation indication of one bit.

In a possible implementation, the spatial reuse limitation indication may further include two or more bits. This is not limited in this application.

In a possible implementation, the spatial reuse group indication includes at least one of the following: an identifier of the one or more basic service sets, a color of the one or more basic service sets, or a bitmap corresponding to the one or more basic service sets. Specifically, the spatial reuse limitation indication may be the identifier of the one or more basic service sets, or the spatial reuse limitation indication may be the color of the one or more basic service sets, or the spatial reuse limitation indication may be the bitmap corresponding to the one or more basic service sets. It can be learned from this implementation that the basic service set can be accurately identified based on the identifier of the basic service set, the color of the basic service set, or the bitmap corresponding to the basic service set, thereby improving accuracy of the spatial reuse group indication.

In a possible implementation, the one or more basic service sets are included in one or more basic service set groups, and the spatial reuse group indication includes at least one of the following: a group identifier of the one or more basic service set groups, or a bitmap corresponding to the one or more basic service set groups. It can be learned from this implementation that one basic service set group may include two or more basic service sets. Therefore, the basic service set can be accurately identified based on the group identifier of the basic service set group or the bitmap corresponding to the basic service set group, to effectively save transmission resources. For example, one basic service set group includes five basic service sets. A group identifier of the basic service set group may indicate the five basic service set groups, while identifiers of five basic service sets are needed to indicate the five basic service sets.

In a possible implementation, the spatial reuse limitation indication and the spatial reuse group indication are carried in the same trigger frame. It can be learned from this implementation that the two indications: the spatial reuse limitation indication and the spatial reuse group indication are carried in the trigger frame, so that functions of the two indications can be implemented through sending the trigger frame at a time, to reduce overheads of system resources and improve transmission efficiency.

In a possible implementation, the spatial reuse group indication is carried in a padding part of the trigger frame. To identify the spatial reuse group indication and a real padding part, the padding part further includes a special association identifier. The special association identifier includes an association identifier that is not allocated by the first access point to a station associated with the first access point, to identify the spatial reuse group indication in the padding part of the trigger frame. The special association identifier may further include an unused association identifier.

In a possible implementation, the association identifier that is not allocated by the first access point to the station associated with the first access point includes any association identifier of 2008 to 2044 and 2047 to 4094.

In a possible implementation, the special association identifier is 4095. Herein, 4095 is an association identifier that is allocated to identify the padding part of the trigger frame. This association identifier is used to facilitate identification performed by a station or an access point, to avoid a phenomenon that the station or the access point cannot identify the association identifier.

In a possible implementation, the spatial reuse limitation indication is carried in a trigger frame, and the spatial reuse group indication is carried in a management frame different from the trigger frame. It can be learned from this implementation that the spatial reuse limitation indication and the spatial reuse group indication are respectively carried in two different frames, to implement asynchronous indication for the spatial reuse group indication and the spatial reuse limitation indication. The two indications are not limited to synchronous configuration. In this way, the two indications are configured more flexibly, to be adapted to an application scenario in which the spatial reuse group indication and the spatial reuse limitation indication are sequentially configured.

In a possible implementation, the spatial reuse limitation indication is carried in a reserved bit in a common information (common information, Common info) field in the trigger frame.

In a possible implementation, the spatial reuse limitation indication and the spatial reuse group indication are both carried in a spatial reuse set element.

In a possible implementation, the spatial reuse limitation indication is carried in a reserved bit in a spatial reuse control field in a spatial reuse set element.

According to a second aspect, an embodiment of this application provides a spatial reuse indication method, including: A station receives a spatial reuse limitation indication and a spatial reuse group indication. The spatial reuse limitation indication is used to indicate whether only a node in a spatial reuse group is allowed for spatial reuse. The spatial reuse group indication is used to indicate the spatial reuse group. The spatial reuse group includes one or more basic service sets. Herein, the "more basic service sets" indicate two or more basic service sets. Further, the station determines, based on the received spatial reuse limitation indication and the received spatial reuse group indication, whether to perform spatial reuse based on a spatial reuse parameter. It should be understood that, that the station determines whether to perform spatial reuse based on the spatial reuse parameter is determining of a capability of the station, and only indicates that the station determines whether the station has a right for spatial reuse.

It can be learned from the technical solutions of the second aspect that this application has the following advantages: In the technical solutions, a range of nodes in spatial reuse can be limited to a node in a basic service set belonging to the spatial reuse group, thereby finally reducing a quantity of nodes in spatial reuse, reducing mutual interference between the nodes in spatial reuse, and improving spatial reuse system performance.

In a possible implementation, if the spatial reuse limitation indication is a first value, it indicates that only the node in the spatial reuse group is allowed for spatial reuse, and a node outside the spatial reuse group is not allowed for spatial reuse, that is, the range of nodes in spatial reuse is limited by the spatial reuse group; or if the spatial reuse limitation indication is a second value, it indicates that a node allowed for spatial reuse is not limited by the spatial reuse group, that is, when the station performs spatial reuse, the station does not need to consider whether the spatial reuse group exists, or does not need to consider whether the station is in the spatial reuse group or outside the spatial reuse group. Being not limited by the spatial reuse group may be understood as performing spatial reuse according to an existing spatial reuse method in 802.11ax. Therefore, it may also be described as follows: If the spatial reuse limitation indication is the second value, it indicates that all nodes in an overlapping basic service set can perform spatial reuse based on a spatial reuse parameter. It may be further described as follows: If the spatial reuse limitation indication is the second value, it indicates that the node in the spatial reuse group and the node outside the spatial reuse group can both perform spatial reuse based on the spatial reuse parameter.

It should be noted that, in the second aspect, other descriptions about the spatial reuse limitation indication and the spatial reuse group indication are similar to the descriptions about the related parts in the first aspect. Details are not described in this application again.

In a possible implementation, the spatial reuse limitation indication and the spatial reuse group indication both come from a first access point in a basic service set different from a basic service set in which the station is located.

In a possible implementation, if the spatial reuse limitation indication is a first value, and the basic service set to which the station belongs is included in the one or more basic service sets indicated by the spatial reuse group indication, the station performs spatial reuse based on the spatial reuse parameter. If the spatial reuse limitation indication is a first value, and the basic service set to which the station belongs is not included in the one or more basic service sets indicated by the spatial reuse group indication, the station does not perform spatial reuse based on the spatial reuse parameter. If the spatial reuse limitation indication is a second value, the station does not perform spatial reuse based on the spatial reuse parameter, regardless of whether the basic service set to which the station belongs is included in or not included in the one or more basic service sets indicated by the spatial reuse group indication.

Specifically, a specific implementation in which the station determines, based on the spatial reuse limitation indication and the spatial reuse group indication, whether to perform spatial reuse based on the spatial reuse parameter may be: The station determines a value of the spatial reuse limitation indication. If the spatial reuse limitation indication is the second value, the station performs spatial reuse based on the spatial reuse parameter. If the spatial reuse limitation indication is the first value, the station further determines whether the basic service set to which the station belongs is included in the one or more basic service sets indicated by the spatial reuse group indication. If the basic service set to which the station belongs is included in the one or more basic service sets indicated by the spatial reuse group indication, the station determines that the station can perform spatial reuse based on the spatial reuse parameter. If the basic service set to which the station belongs is not included in the one or more basic service sets indicated by the spatial reuse group indication, the station determines that the station cannot perform spatial reuse. It should be noted that a sequence of determining the spatial reuse limitation indication and the spatial reuse group indication is not specifically limited in this application.

In a possible implementation, the spatial reuse limitation indication and the spatial reuse group indication are carried in the same trigger frame. It can be learned from this implementation that the two indications: the spatial reuse limitation indication and the spatial reuse group indication are carried in the trigger frame, so that functions of the two indications can be implemented through sending the trigger frame at a time, to reduce overheads of system resources and improve transmission efficiency.

In an implementation, specifically, the spatial reuse group indication is carried in a padding part of the trigger frame. To identify the spatial reuse group indication and a real padding part, the padding part further includes a special association identifier. The special association identifier includes an unused association identifier or an association identifier that is not allocated by the first access point to a station associated with the first access point, to identify the spatial reuse group indication in the padding part of the trigger frame.

In a possible implementation, the association identifier that is not allocated to the station specifically includes any association identifier of 2008 to 2044 and 2047 to 4094.

In a possible implementation, the special association identifier is 4095. Herein, 4095 is an association identifier that is allocated to identify the padding part of the trigger frame. This association identifier is used to facilitate identification performed by a station or an access point, to avoid a phenomenon that the station or the access point cannot identify the association identifier.

In a possible implementation, the spatial reuse limitation indication is carried in a reserved bit in a common information (common information, Common info) field in the trigger frame.

In a possible implementation, the spatial reuse limitation indication and the spatial reuse group indication are both carried in a spatial reuse set element.

In a possible implementation, the spatial reuse limitation indication may be carried in a reserved bit in a spatial reuse control field in a spatial reuse set element.

In a possible implementation, the spatial reuse limitation indication comes from a first access point in a basic service set different from a basic service set to which the station belongs, and the spatial reuse group indication comes from a second access point in a basic service set the same as the basic service set to which the station belongs.

In a possible implementation, if the spatial reuse limitation indication is a first value, and the basic service set to which the first access point belongs is included in the one or more basic service sets indicated by the spatial reuse group indication, the station performs spatial reuse based on the spatial reuse parameter. If the spatial reuse limitation indication is a first value, and the basic service set to which the first access point belongs is not included in the one or more basic service sets indicated by the spatial reuse group indication, the station does not perform spatial reuse based on the spatial reuse parameter. If the spatial reuse limitation indication is a second value, the station does not perform spatial reuse, regardless of whether the basic service set to which the first access point belongs is included in or not included in the one or more basic service sets indicated by the spatial reuse group indication.

Specifically, in a possible implementation, if the spatial reuse limitation indication is the second value, the station determines that the station can perform spatial reuse based on the spatial reuse parameter. If the spatial reuse limitation indication is the first value, the station determines whether the basic service set to which the first access point belongs is included in the one or more basic service sets indicated by the spatial reuse group indication. If the basic service set to which the first access point belongs is included in the one or more basic service sets indicated by the spatial reuse group indication, the station determines that the station can perform spatial reuse based on the spatial reuse parameter. If the basic service set to which the first access point belongs is not included in the one or more basic service sets indicated by the spatial reuse group indication, the station determines that the station cannot perform spatial reuse.

In a possible implementation, the spatial reuse limitation indication is carried in a trigger frame, and the spatial reuse group indication is carried in a management frame different from the trigger frame.

According to a third aspect, an embodiment of this application further provides a spatial reuse indication method, including: A first access point generates a spatial reuse limitation indication. The spatial reuse limitation indication is used to indicate whether only a node in a spatial reuse group is allowed for spatial reuse. The spatial reuse group includes one or more basic service sets. Further, the first access point sends the spatial reuse limitation indication generated by the first access point.

It can be learned from the technical solutions of the third aspect that the technical solutions of this application have the following advantages: The spatial reuse group is introduced, and the spatial reuse limitation indication is used to limit a range of nodes in spatial reuse, so that the range of nodes in spatial reuse can be limited to a node in a basic service set belonging to the spatial reuse group, thereby finally reducing a quantity of nodes that can participate in spatial reuse, reducing mutual interference between the nodes in spatial reuse, and improving spatial reuse system performance.

For another possible implementation of the third aspect, refer to the related description about the spatial reuse limitation indication in the first aspect. Details are not described herein again.

According to a fourth aspect, an embodiment of this application further provides a spatial reuse indication method, including: A second access point generates a spatial reuse group indication. A spatial reuse group includes one or more basic service sets. Further, the second access point sends the spatial reuse group indication.

It can be learned from the technical solutions of the third aspect that the technical solutions of this application have the following advantages: The spatial reuse group is introduced by using the spatial reuse group indication to provide a limitation base for a spatial reuse limitation indication, to implement limitation on spatial reuse by using the spatial reuse group, thereby finally reducing a quantity of nodes that can participate in spatial reuse, reducing mutual interference between the nodes in spatial reuse, and improving spatial reuse system performance.

For another possible implementation of the fourth aspect, refer to the related description about the spatial reuse group indication in the first aspect. Details are not described herein again.

According to a fifth aspect, an embodiment of this application provides a wireless communications apparatus, including a processing module and a sending module. The processing module is configured to generate a spatial reuse limitation indication and a spatial reuse group indication. The spatial reuse limitation indication is used to indicate whether only a node in a spatial reuse group is allowed for spatial reuse. The spatial reuse group indication is used to indicate the spatial reuse group. The spatial reuse group includes one or more basic service sets. Herein, "more" indicates two or more. The sending module is configured to send the spatial reuse limitation indication and the spatial reuse group indication.

For the wireless communications apparatus in the fifth aspect, the spatial reuse group is introduced, and the spatial reuse limitation indication is used to limit a range of nodes in spatial reuse, so that the range of nodes in spatial reuse can be limited to a node in a basic service set belonging to the spatial reuse group, thereby finally reducing a quantity of nodes in spatial reuse, reducing mutual interference between the nodes in spatial reuse, and improving spatial reuse system performance.

In a possible implementation, the wireless communications apparatus may include a communications device or a processor. Optionally, the processor may include a chip, or may include a chip and another discrete device.

Another possible implementation is similar to the implementation corresponding to the first access point in the first aspect. For a specific description, refer to the description about the related part of the first access point in the first aspect. Details are not described in this application again.

According to a sixth aspect, an embodiment of this application further provides a wireless communications apparatus. The wireless communications apparatus may specifically include a communications device or a processor. Optionally, the processor may include a chip, or may include a chip and another discrete device. The wireless communications apparatus is configured to implement the functions of the first access point and perform the method in the third aspect, or implement the functions of the second access point and perform the method in the fourth aspect.

According to a seventh aspect, an embodiment of this application provides a wireless communications apparatus, including a processing module and a receiving module. The receiving module is configured to receive a spatial reuse limitation indication and a spatial reuse group indication. The spatial reuse limitation indication is used to indicate whether only a node in a spatial reuse group is allowed for spatial reuse. The spatial reuse group indication is used to indicate the spatial reuse group. The spatial reuse group includes one or more basic service sets. Herein, the "more basic service sets" indicate two or more basic service sets. The processing module is configured to determine, based on the received spatial reuse limitation indication and the received spatial reuse group indication, whether to perform spatial reuse based on a spatial reuse parameter. It should be understood that, that the wireless communications apparatus determines whether to perform spatial reuse based on the spatial reuse parameter is determining of a capability of the wireless communications apparatus, and only indicates that the wireless communications apparatus determines whether the wireless communications apparatus has a right for spatial reuse.

For the wireless communications apparatus in the sixth aspect, a range of nodes in spatial reuse can be limited to a node in a basic service set belonging to the spatial reuse group, thereby finally reducing a quantity of nodes in spatial reuse, reducing mutual interference between the nodes in spatial reuse, and improving spatial reuse system performance.

In a possible implementation, the wireless communications apparatus may include a communications device or a processor. Optionally, the processor may include a chip, or may include a chip and another discrete device.

Another possible implementation is similar to the implementation corresponding to the station in the second aspect. For a specific description, refer to the description about the related part of the station in the second aspect. Details are not described in this application again.

According to an eighth aspect, an embodiment of this application provides a computer readable storage medium. The computer readable storage medium stores a computer program. The computer program includes at least one segment of code. The at least one segment of code may be executed by a computer, to control the computer to perform the spatial reuse indication method in the first aspect or any possible implementation of the first aspect, the second aspect or any possible implementation of the second aspect, the third aspect or any possible implementation of the third aspect, or the fourth aspect or any possible implementation of the fourth aspect.

According to a ninth aspect, an embodiment of this application provides a computer program product. The computer program product includes a computer program. When the computer program is executed by a computer, the computer is configured to perform the spatial reuse indication method in the first aspect or any possible implementation of the first aspect, the second aspect or any possible implementation of the second aspect, the third aspect or any possible implementation of the third aspect, or the fourth aspect or any possible implementation of the fourth aspect.

It should be noted that the computer program in the ninth aspect may be all or partially stored in a storage medium that is encapsulated with a processor, or may be all or partially stored in a memory that is not encapsulated with a processor.

According to a tenth aspect, an embodiment of this application provides a communications device, including a memory and a processor. The memory is coupled to the processor. The memory is configured to store a computer operation instruction. The processor is configured to invoke the computer operation instruction to perform the spatial reuse indication method in the first aspect or any possible implementation of the first aspect, the second aspect or any possible implementation of the second aspect, the third aspect or any possible implementation of the third aspect, or the fourth aspect or any possible implementation of the fourth aspect.

According to an eleventh aspect, an embodiment of this application provides a processor. The processor is configured to support a wireless communications device in performing the spatial reuse indication method in the first aspect or any possible implementation of the first aspect, the third aspect or any possible implementation of the third aspect, or the fourth aspect or any possible implementation of the fourth aspect. Optionally, the processor may include a chip, or may include a chip and another discrete device.

According to a twelfth aspect, an embodiment of this application provides a processor. The processor is configured to support a wireless communications device in performing the spatial reuse indication method in the second aspect or any possible implementation of the second aspect. Optionally, the processor may include a chip, or may include a chip and another discrete device.

According to a thirteenth aspect, another chip is provided, including an input interface, an output interface, and a processor. Optionally, the chip further includes a memory. The input interface, the output interface, the processor, and the memory are interconnected through an internal connection path. The processor is configured to execute code in the memory. When the code is executed, the processor is configured to perform the methods in the foregoing aspects.

According to a fourteenth aspect, an apparatus is provided. The apparatus is configured to implement the methods in the foregoing aspects.

DESCRIPTION OF EMBODIMENTS

The following describes the embodiments of this application with reference to the accompanying drawings. Apparently, the described embodiments are merely a part rather than all of the embodiments of this application. A person of ordinary skill in the art may know that, with development of technologies and emergence of a new scenario, the technical solutions provided in the embodiments of this application are also applicable to a similar technical problem.

The embodiments of this application provide a spatial reuse indication method and a wireless communications apparatus, to limit a range of nodes in spatial reuse to a node in a spatial reuse group, thereby reducing a quantity of nodes that can participate in spatial reuse, reducing mutual interference between nodes in spatial reuse, and improving spatial reuse system performance. Details are separately described in the following.

Figure 1A:
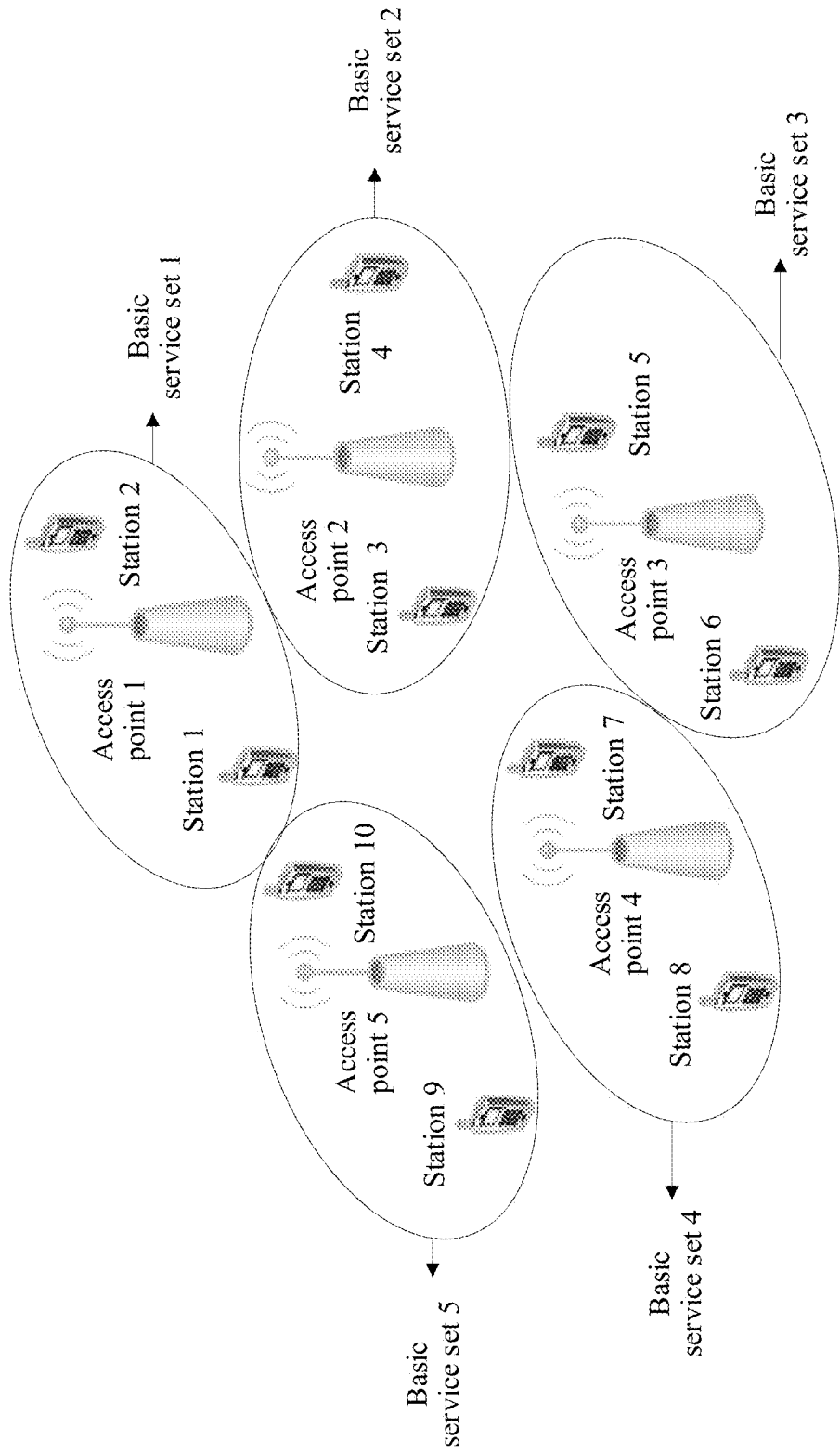
FIG. 1A is a schematic diagram of a scenario of a wireless communications system according to an embodiment of this application.

FIG. 1A is a schematic diagram of a scenario of a wireless communications system according to an embodiment of this application.

As shown in FIG. 1A, the scenario of the wireless communications system includes five basic service sets: a basic service set 1, a basic service set 2, a basic service set 3, a basic service set 4, and a basic service set 5. Each of the foregoing basic service sets includes one wireless access device and two wireless terminal devices. FIG. 1A is described by using an example in which the wireless access device is an access point and the wireless terminal device is a station. Specifically, the basic service set may be a BSS (basic service set), the access point may be an access point (AP) in the BSS, and the station may be a station (STA) in the BSS. A quantity of wireless access devices and a quantity of wireless terminal devices shown in this embodiment of this application are merely examples. The access point and the station may be both referred to as nodes in the basic service set.

In the wireless communications system, the station (STA) is a device that has a wireless connection function and that can provide voice and/or data connectivity to a user. The station may also be referred to as a terminal device, user equipment (UE), a mobile station (MS), a mobile terminal (MT), or the like. Currently, the station is, for example, a mobile phone, a tablet computer, a notebook computer, a palmtop computer, a mobile Internet device (MID), a wearable device, a virtual reality (VR) device, an augmented reality (AR) device, a wireless terminal in industrial control, a wireless terminal in self-driving, a wireless terminal in remote medical surgery, a wireless terminal in a smart grid, a wireless terminal in transportation, a wireless terminal in a smart city, a wireless terminal in a smart home, or a vehicle-mounted device.

The access point AP) is a device that connects the station to a wireless network in the communications system. The access point may also be referred to as a radio access network (RAN) node (or device), a base station, or the like. Currently, the access point is, for example, a gNB, a transmission/reception point (TRP), an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), a Wi-Fi access point (AP), or another interface device that can work in a wireless environment.

The BSS in this embodiment of this application indicates a set of one AP and a plurality of STAs associated with the AP. For detailed descriptions of the BSS, refer to related descriptions in the IEEE802.11-2016 standard. Details are not described in this application. An overlapping basic service set (OBSS) may be another BSS that has the same operating channel as the BSS in which the STA is located and whose coverage partially or all overlaps coverage of the BSS in which the STA is located.

This embodiment of this application provides a spatial reuse-based wireless communications system. The spatial reuse-based wireless communications system is applicable to a highly density deployment scenario including a plurality of wireless access devices and a plurality of wireless terminal devices, for example, the scenario of the wireless communications system in FIG. 1A. In the spatial reuse-based wireless communications system, a spatial reuse group including one or more basic service sets is introduced, and the spatial reuse group is used to limit a basic service set range allowed for spatial reuse, to perform spatial reuse based on a spatial reuse parameter. The following provides detailed descriptions.

Figure 1B:
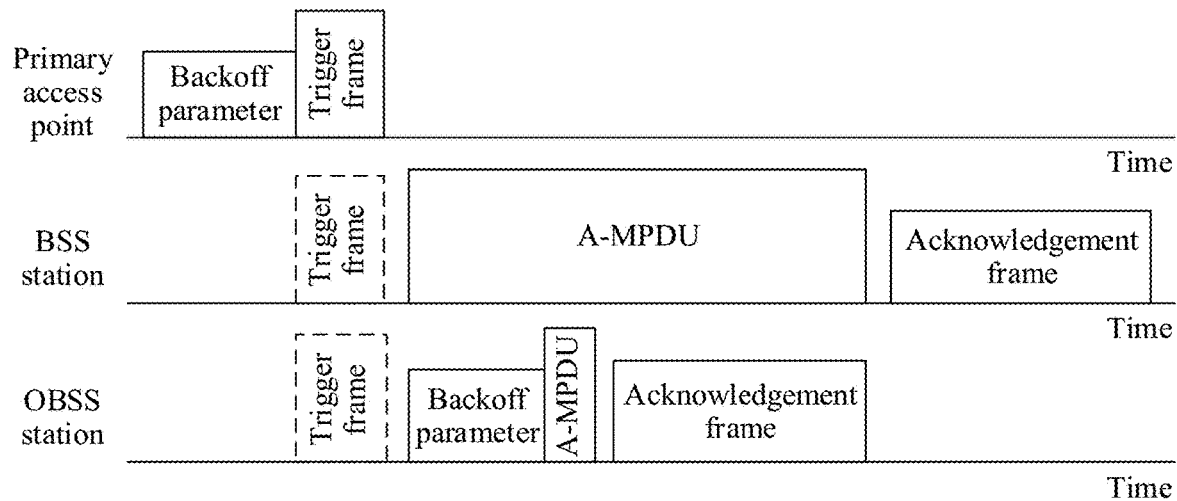
FIG. 1B is a schematic diagram of a time sequence of spatial reuse based on a spatial reuse parameter according to an embodiment of this application.

FIG. 1B is a diagram of a time sequence of spatial reuse based on a spatial reuse parameter.

(1) Before transmitting a data frame, a primary link initiator needs to send a trigger frame TF. The trigger frame TF carries a spatial reuse parameter SRP and information indicating whether spatial reuse SR is allowed. It should be understood that the primary link initiator may also be referred to as a primary access point (primary AP). The primary access point (primary AP) described in this application is the first access point. Details are not described in the following.

(2) After a BSS station (BSS STA) receives the trigger frame (TF), the BSS station sends a data frame to the primary access point, for example, an aggregate medium access control protocol data unit (A-MPDU) described in FIG. 1B.

(3) After an OBSS station (OBSS STA) receives the trigger frame TF from another OBSS station having a service to be transmitted on a link and the trigger frame (TF) allows spatial reuse based on the spatial reuse parameter, the OBSS station ignores a data frame, signal energy, and clear channel assessment (CCA) of a primary link; continues to perform a backoff process, for example, a backoff parameter part in FIG. 1B; and sends a data frame after the backoff ends, for example, an A-MPDU. If the trigger frame TF does not allow spatial reuse based on the spatial reuse parameter, the OBSS station does not perform spatial reuse, and sets a network allocation vector (NAV) according to a normal procedure. This is not shown in FIG. 1B. It should be noted that the another OBSS station having a service to be transmitted may be an access point in an OBSS, or may be a station in an OBSS. It may be understood that if the AP in the OBSS determines that spatial reuse can be performed, the data frame sent after the backoff ends is a downlink data frame, that is, downlink data transmission is performed on the link; or if the STA in the OBSS determines that spatial reuse can be performed, the data frame sent after the backoff ends is an uplink data frame, that is, uplink data transmission is performed on the link.

It should be noted that, as shown in FIG. 1B, after the A-MPDU is sent, the BSS station and the OBSS station send acknowledgment frames.

In the spatial reuse process based on the spatial reuse parameter shown in FIG. 1B, when the primary access point (primary AP) allows the OBSS station to initiate a parallel link, the BSS station and the OBSS station that receive the trigger frames TFs further obtain a spatial reuse parameter SRP value. The spatial reuse parameter SRP value is power control information of the primary link to a secondary link. The value is an adjustable parameter, and is denoted as an SRP. Herein, P=SRP−TFP$_{RX}$, where P is a transmit power of the secondary link after power control, and TFP$_{RX}$ is a receive power of the TF. If P is greater than or equal to P$_{min}$, and P$_{min}$ is a minimum transmit power of the secondary link, the station is allowed to start a backoff process based on the spatial reuse parameter SRP; or otherwise, the station continues to suspend channel contention. If the station successfully accesses a channel, an actual transmit power is min(P, P$_{max}$), where P$_{max}$ is a maximum transmit power of the secondary link.

The spatial reuse-based wireless communications system provided in this embodiment of this application includes a plurality of access points and a plurality of stations. The plurality of access points may include a first access point belonging to a different basic service set from the station, and further include a second access point belonging to the same basic service set as the station. It may also be understood that the first access point may include but is not limited to an access point in an overlapping basic service set OBSS corresponding to the station, and the second access point is an access point in a local BSS corresponding to the station. The spatial reuse-based wireless communications system includes but is not limited to the following cases:

In a first case, the first access point is configured to generate a spatial reuse limitation indication and a spatial reuse group indication. The spatial reuse limitation indication indicates whether only a node in a spatial reuse group is allowed for spatial reuse. The spatial reuse group indication is used to indicate the spatial reuse group. The spatial reuse group includes one or more basic service sets. In other words, the spatial reuse group indication is used to indicate a specific basic service set included in the spatial reuse group corresponding to the spatial reuse limitation indication. The node indicates an access point or a station corresponding to the basic service set included in the spatial reuse group. Further, the first access point is configured to send the spatial reuse limitation indication and the spatial reuse group indication, to notify a corresponding station of a corresponding spatial reuse capability.

In a second case, the first access point is configured to generate and send a spatial reuse limitation indication. The spatial reuse limitation indication indicates whether only a node in a spatial reuse group is allowed for spatial reuse. The node indicates an access point or a station corresponding to a basic service set included in a spatial reuse group. The second access point is configured to generate and send a spatial reuse group indication. The spatial reuse group indication is used to indicate the spatial reuse group. The spatial reuse group includes one or more basic service sets. In other words, the spatial reuse group indication is used to indicate a specific basic service set included in the spatial reuse group corresponding to the spatial reuse limitation indication.

For example, as shown in FIG. 1A, the one or more basic service sets indicated by the spatial reuse group indication include the basic service set 1, the basic service set 2, the basic service set 3, the basic service set 4, and the basic service set 5 shown in FIG. 1A. The spatial reuse limitation indication is used to limit whether only a station in the spatial reuse group including the basic service set 1, the basic service set 2, the basic service set 3, the basic service set 4, and the basic service set 5 is allowed for spatial reuse.

The station is configured to: receive the spatial reuse limitation indication and the spatial reuse group indication; and determine, based on the received spatial reuse group indication and the received spatial reuse limitation indication, whether to perform spatial reuse based on the spatial reuse parameter. It should be noted that the station on the secondary link that receives the spatial reuse limitation indication and the spatial reuse group indication may be either an AP or a non-AP station (non-AP STA). If the AP on the secondary link determines that spatial reuse can be performed based on the spatial reuse parameter, downlink transmission is performed on the secondary link. If the non-AP STA on the secondary link determines that spatial reuse can be performed based on the spatial reuse parameter, uplink transmission is performed on the secondary link.

Specifically, if the spatial reuse limitation indication and the spatial reuse group indication come from the first access point in the basic service set different from the basic service set in which the station is located, the station is configured to: determine a value of the spatial reuse limitation indication; and if the spatial reuse limitation indication is a second value, perform spatial reuse based on the spatial reuse parameter; or if the spatial reuse limitation indication is a first value, further determine whether the basic service set to which the station belongs is included in the one or more basic service sets indicated by the spatial reuse group indication, and if the basic service set to which the station belongs is included in the one or more basic service sets indicated by the spatial reuse group indication, determine that the station can perform spatial reuse based on the spatial reuse parameter, or if the basic service set to which the station belongs is not included in the one or more basic service sets indicated by the spatial reuse group indication, determine that the station cannot perform spatial reuse.

If the spatial reuse limitation indication comes from the first access point in the basic service set different from the basic service set to which the station belongs, and the spatial reuse group indication comes from the second access point in the basic service set the same as the basic service set to which the station belongs, the station is configured to: determine a value of the spatial reuse limitation indication; and if the spatial reuse limitation indication is a second value, determine that the station can perform spatial reuse based on the spatial reuse parameter; or if the spatial reuse limitation indication is a first value, further determine whether the basic service set to which the first access point belongs is included in the one or more basic service sets indicated by the spatial reuse group indication, and if the basic service set to which the first access point belongs is included in the one or more basic service sets indicated by the spatial reuse group indication, determine that the station can perform spatial reuse based on the spatial reuse parameter, or if the basic service set to which the first access point belongs is not included in the one or more basic service sets indicated by the spatial reuse group indication, determine that the station cannot perform spatial reuse based on the spatial reuse parameter.

Optionally, the spatial reuse limitation indication may include one bit. A first value corresponding to the bit is 1, and a second value corresponding to the bit is 0.

In the spatial reuse-based wireless communications system provided in this embodiment of this application, the spatial reuse limitation indication and the spatial reuse group indication may be carried in the same manner or in different manners. For example, the spatial reuse limitation indication and the spatial reuse group indication may be both carried in a trigger frame; or the spatial reuse limitation indication is carried in a trigger frame, and the spatial reuse group indication is carried in a management frame different from the trigger frame.

In the spatial reuse-based wireless communications system provided in this embodiment of this application, a manner for indicating the spatial reuse group by using the spatial reuse group indication may be implemented by using at least one of the following: an identifier of the one or more basic service sets, a color of the one or more basic service sets, or a bitmap corresponding to the one or more basic service sets.

In addition, the basic service sets may also be grouped, to use a plurality of basic service sets as one basic service set group, so that the basic service set group can be further used to indicate the spatial reuse group. For example, the spatial reuse group indication may include at least one of the following: a group identifier of one or more basic service set groups, or a bitmap corresponding to one or more basic service set groups.

The foregoing describes in detail the system application scenario and the spatial reuse-based communications system in this embodiment of this application. To further understand the spatial reuse indication method provided in the embodiments of this application, the following provides detailed descriptions with reference to specific embodiments.

Figure 2:
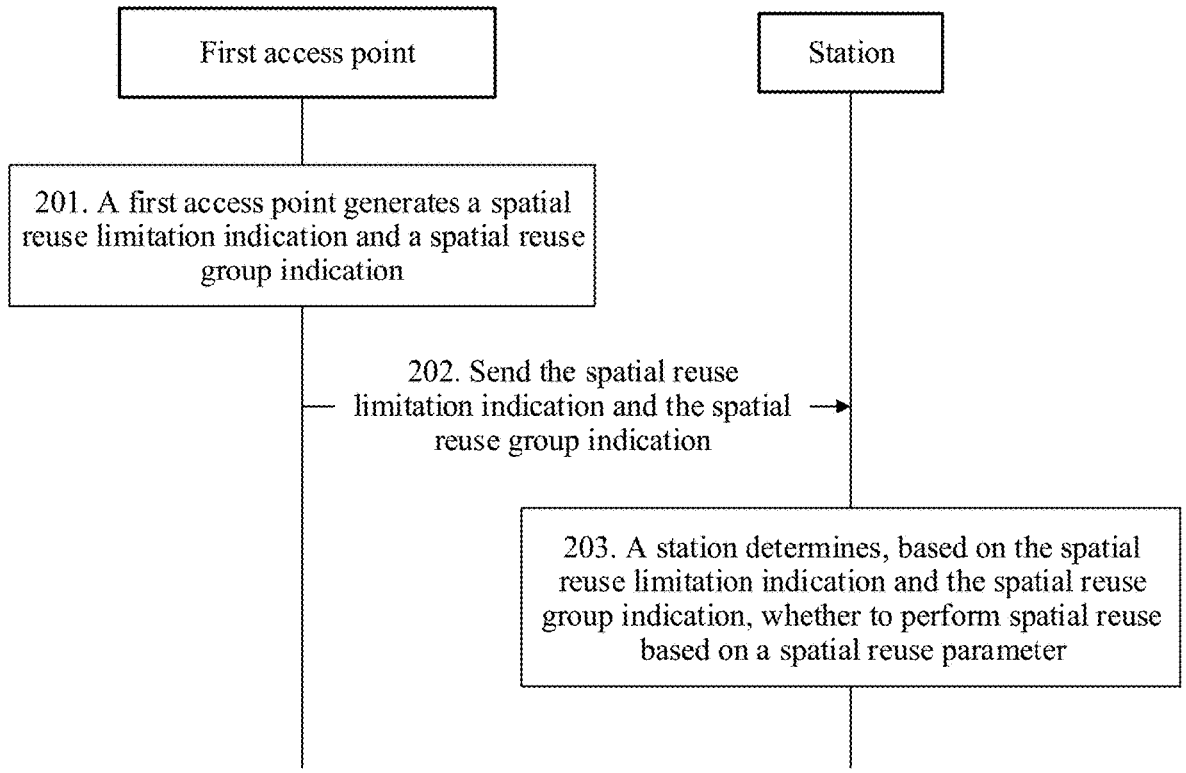
FIG. 2 is a schematic flowchart of a spatial reuse indication method according to an embodiment of this application.

The following separately describes the first case and the second case in detail with reference to the specific embodiments. The first case is first described as follows:

FIG. 2 is a schematic flowchart of a spatial reuse (SR) indication method according to an embodiment of this application.

As shown in FIG. 2, the spatial reuse (SR) indication method in this embodiment of this application includes the following steps:

201. A first access point generates a spatial reuse limitation indication and a spatial reuse group indication.

The spatial reuse limitation indication is used to indicate whether only a node in a spatial reuse group is allowed for spatial reuse, and the spatial reuse group indication is used to indicate the spatial reuse group. The spatial reuse group includes one or more basic service sets. The spatial reuse group in this application may be denoted as an SRP group or an SR group. It should be understood that a function of the spatial reuse limitation indication is to limit a range of nodes in spatial reuse. For example, the limited range of nodes in spatial reuse is limited to only the node in the spatial reuse group; or the limited range of nodes in spatial reuse may be the node in the spatial reuse group or a node outside the spatial reuse group, that is, the range of nodes in spatial reuse is not limited to only the node in the spatial reuse group. It should be noted that the "spatial reuse limitation indication" is merely a name and may also be under another name, for example, a "first indication". Similarly, the "spatial reuse group indication" is also merely a name and may also be under another name, for example, a "second indication", to finally indicate grouping information of the spatial reuse group, that is, indicate a specific basic service set included in the spatial reuse group.

Optionally, in an implementation, the spatial reuse limitation indication is used to indicate whether to limit the range of nodes in spatial reuse. This function may be implemented based on a value of the spatial reuse limitation indication. Specifically, if the spatial reuse limitation indication is a first value, it indicates that the range of nodes in spatial reuse is limited, that is, indicates that only the node in the spatial reuse group is allowed for spatial reuse; or if the spatial reuse limitation indication is a second value, it indicates that the range of nodes in spatial reuse is not limited. In other words, when the station performs spatial reuse, the station does not need to consider whether the spatial reuse group exists, or does not need to consider whether the station is in the spatial reuse group or outside the spatial reuse group. In other words, nodes in an OBSS can all perform spatial reuse.

Optionally, the spatial reuse limitation indication may include one or more bits. In an implementation, the spatial reuse limitation indication includes one bit. For example, the first value corresponding to the spatial reuse limitation indication is 1, and the second value corresponding to the spatial reuse limitation indication is 0.

Optionally, in an implementation, an indication manner of the spatial reuse group indication may be implemented by using an identifier (BSS ID) of the one or more basic service sets included in the spatial reuse group, or may be implemented by using a color (BSS color) of the one or more basic service sets included in the spatial reuse group, or may be implemented by using a bitmap (bitmap) corresponding to the one or more basic service sets included in the spatial reuse group. Optionally, the bitmap includes a plurality of bits. The plurality of bits correspond to a plurality of basic service sets. Each bit is used to indicate whether a corresponding basic service set is included in the spatial reuse group. For example, a bit value of 1 indicates that a corresponding basic service set is included in the spatial reuse group, and a bit value of 0 indicates that a corresponding basic service set is not included in the spatial reuse group. As shown in FIG. 1A, the spatial reuse group includes the five basic service sets shown in FIG. 1A, and the spatial reuse group indication may include at least one of an identifier (BSS ID), a color (BSS color), or a bitmap (BSS bitmap) corresponding to each of the basic service set 1 to the basic service set 5. For example, as shown in FIG. 1A, the BSS bitmap may include eight bits, and values of five bits corresponding to the five basic service sets in FIG. 1A are 1.

In addition, the basic service sets may be grouped in advance to obtain the basic service set group that is denoted as a BSS group. For example, the five basic service sets shown in FIG. 1A are divided into two basic service set groups. A first basic service set group (BSS group1) includes the basic service set 1 and the basic service set 2, and a second basic service set group (BSS group2) includes the basic service set 3, the basic service set 4, and the basic service set 5. A manner for grouping the basic service sets is not limited in this application. Optionally, an indication manner of the spatial reuse group indication may be further implemented by using at least one of a group identifier (BSS group ID) of one or more basic service set groups or a bitmap (BSS group bitmap) corresponding to one or more basic service set groups. For example, the spatial reuse group indication may include a group identifier (BSS group1 ID) of the first basic service set group, or the spatial reuse group indication includes a bitmap (BSS group1 bitmap) corresponding to the first basic service set group, to indicate that the spatial reuse group includes the basic service set 1 and the basic service set 2.

It should be noted that, in this embodiment of this application, the spatial reuse group indication may be stored by using a plurality of bits (bit) or a plurality of bytes (byte). This is not limited in this application.

202. The first access point sends the spatial reuse limitation indication and the spatial reuse group indication to a station.

The first access point may send the spatial reuse limitation indication and the spatial reuse group indication to the station at the same time; or may first send the spatial reuse group indication, and then send the spatial reuse limitation indication. A sequence of sending the two indications is not limited in this application.

Optionally, in a first information carrying implementation, the first access point may also add the spatial reuse limitation indication and the spatial reuse group indication to the same frame for sending. For example, the first access point adds both the spatial reuse limitation indication and the spatial reuse group indication to a trigger frame (TF) for sending. In an example, the spatial reuse limitation indication is carried in one or more reserved bits in a common information field in the trigger frame (TF). In an example, the spatial reuse group indication is carried in a padding part in the trigger frame. A field for carrying the spatial reuse group indication in the padding part may be referred to as a spatial reuse basic service set indication (SR BSS indication) field. Optionally, the padding part carrying the spatial reuse basic service set indication (SR BSS indication) may further include a special association identifier, to distinguish between the spatial reuse basic service set indication (SR BSS indication) and a real padding part. The special association identifier includes an association identifier (AID) that is not allocated by the first access point to a station associated with the first access point to use.

Optionally, in a second information carrying implementation, the first access point may respectively add the spatial reuse limitation indication and the spatial reuse group indication to different frames for sending. For example, the first access point adds the spatial reuse limitation indication to a trigger frame (TF) for sending, and the first access point adds the spatial reuse group indication to a management frame different from the trigger frame for sending. The management frame includes a beacon frame, and a probe response frame. The management frame may be alternatively a newly designed frame. In an example, the spatial reuse limitation indication is carried in one or more reserved bits in a common information (common info) field in the trigger frame TF, and the spatial reuse group indication is carried in a spatial reuse set element in the management frame. A field that is newly added to the spatial reuse set element and that is used to carry the spatial reuse group indication may be referred to as a spatial reuse basic service set indication field. The spatial reuse set element may be denoted as an SR set element or an SRP set element.

It should be noted that in the existing wireless local area network standard IEEE 802.11ax, association identifiers AIDs whose values are 2007 to 2044 and 2047 to 4094 are all unused association identifiers, and an association identifier whose value is 4095 is an association identifier AID corresponding to a padding part in the existing IEEE 802.11ax standard. Therefore, optionally, a value of the special association identifier may be any one of 2007 to 2044 and 2047 to 4095, for example, 4095.

Optionally, in a third information carrying implementation, the spatial reuse group indication and the spatial reuse limitation indication are both carried in a management frame. For example, the spatial reuse limitation indication and the spatial reuse group indication are both carried in a spatial reuse set element in the management frame. In an example, the spatial reuse limitation indication is carried in one or more reserved bits in a spatial reuse field in the spatial reuse set element, and the spatial reuse group indication is carried in a newly added field in the spatial reuse set element. Optionally, the newly added field may be referred to as a spatial reuse basic service set indication (SR BSS indication) field.

It should be further noted that in this embodiment of this application, for frame structures and embodiments corresponding to different information carrying manners, refer to related descriptions corresponding to FIG. 3A to FIG. 7 in the following. Details are not described herein again.

203. The station determines, based on the spatial reuse limitation indication and the spatial reuse group indication, whether to perform spatial reuse based on a spatial reuse parameter.

It should be noted that the station may be a station in a different basic service set from the first access point, or may be an access point in a different basic service set from the first access point.

After receiving the spatial reuse limitation indication and the spatial reuse group indication that are sent by the first access point, the station determines, based on the two indications, whether the station can perform spatial reuse (SR) based on the spatial reuse parameter (SRP).

If the spatial reuse limitation indication is a first value, and a basic service set to which the station belongs is included in the one or more basic service sets indicated by the spatial reuse group indication, the station can perform spatial reuse based on the spatial reuse parameter. If the spatial reuse limitation indication is a first value, and a basic service set to which the station belongs is not included in the one or more basic service sets indicated by the spatial reuse group indication, the station cannot perform spatial reuse based on the spatial reuse parameter. If the spatial reuse limitation indication is a second value, the station cannot perform spatial reuse based on the spatial reuse parameter, regardless of whether a basic service set to which the station belongs is included in or not included in the one or more basic service sets indicated by the spatial reuse group indication.

Specifically, in this embodiment, the access point that sends the spatial reuse limitation indication and the spatial reuse group indication is the first access point in the different basic service set from the station. Therefore, the station determines, based on the received spatial reuse group indication, the basic service set included in the spatial reuse group. In addition, the station determines, based on the value of the received spatial reuse limitation indication, whether the spatial reuse limitation indication limits the range of nodes in spatial reuse to the node in the spatial reuse group. If the value of the spatial reuse limitation indication is the first value (for example, 1), that is, only the node in the spatial reuse group is allowed for spatial reuse, the station further determines whether the basic service set included in the spatial reuse group includes the basic service set to which the station belongs. If the basic service set included in the spatial reuse group includes the basic service set to which the station belongs, the station determines that the station can perform spatial reuse based on the spatial reuse parameter. If the basic service set included in the spatial reuse group does not include the basic service set to which the station belongs, the station determines not to perform spatial reuse. If the value of the spatial reuse limitation indication is the second value (for example, 0), that is, the range of nodes in spatial reuse is not limited, and a node in the spatial reuse group and a node outside the spatial reuse group can be both allowed for spatial reuse, the station determines to perform spatial reuse based on the spatial reuse parameter. It should be noted that for a specific operation of spatial reuse based on the spatial reuse parameter, refer to the general procedure corresponding to FIG. 1B. Details are not described herein again.

In this embodiment of this application, the spatial reuse group is introduced, and the spatial reuse limitation indication is used to limit the range of nodes in spatial reuse, so that the range of nodes in spatial reuse can be limited to a node in a basic service set belonging to the spatial reuse group, thereby finally reducing a quantity of nodes in spatial reuse, reducing mutual interference between the nodes in spatial reuse, and improving spatial reuse system performance.

In the following, a frame format in the existing spatial reuse parameter-based spatial reuse technology is improved with reference to different manners for carrying the spatial reuse limitation indication and the spatial reuse group indication described in step 202, to implement the spatial reuse indication method in this application. The following provides detailed descriptions.

In a first information carrying manner, the spatial reuse limitation indication and the spatial reuse group indication are carried in a trigger frame.

Figure 3A:
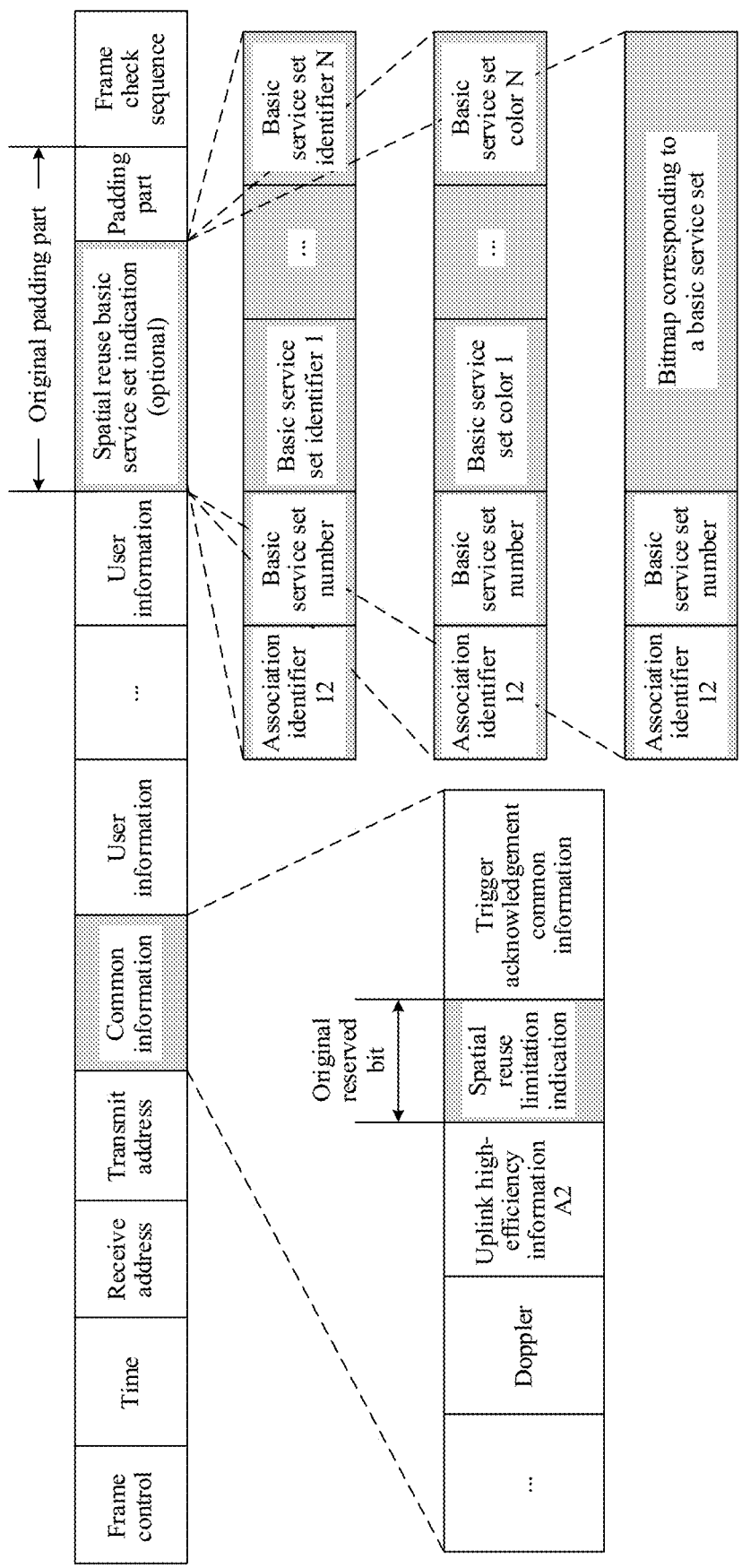
FIG. 3A is a schematic structural diagram of a trigger frame according to an embodiment of this application.

FIG. 3A is a schematic diagram of a frame structure of a trigger frame (TF) according to an embodiment of this application.

As shown in FIG. 3A, the frame structure of the trigger frame (TF) provided in this embodiment of this application is compared with the trigger frame TF in the existing spatial reuse (SR) technology based on the spatial reuse parameter (SRP). As shown in FIG. 3A, one bit in an original reserved bit in a common information (common info) field in the trigger frame is used as a spatial reuse limitation indication (restricted SR) bit. When a value of restricted SR is 0, it indicates that a range of nodes in spatial reuse is not limited to a spatial reuse group. When a value of restricted SR is 1, it indicates that a range of nodes in spatial reuse is limited to a spatial reuse group. In addition, a spatial reuse basic service set indication (SR BSS indication) field is newly added to a padding part of the trigger frame when the value of restricted SR is 1. The SR BSS indication field is used to indicate the spatial reuse group. The SR BSS indication field includes identifiers of a plurality of basic service sets (BSS ID list), colors of a plurality of basic service sets (BSS color list), or bitmaps of a plurality of basic service sets (BSS bitmap). It should be noted that the spatial reuse basic service set indication (SR BSS indication) field is optional. When a value of restricted SR is 1, the padding part of the trigger frame includes the spatial reuse basic service set indication (SR BSS indication) field.

In an example, to distinguish between a user information field (user info field) and a following padding part in the trigger frame, an association identifier AID may be used to mark a start of the spatial reuse basic service set indication (SR BSS indication) field. As shown in FIG. 3A, the association identifier may be an association identifier 12, denoted as an AID 12. A value of the AID 12 may be any one of 2007 to 2044 and 2047 to 4095. Particularly, 4095 is an association identifier of the padding (padding) part.

As shown in FIG. 3A, in an example in which the AID 12 is 4095 in this embodiment, two solutions for distinguishing between the spatial reuse basic service set indication (SR BSS indication) field and a real padding part when the AID 12=4095 are provided.

Solution 1: The AID of the spatial reuse basic service set indication (SR BSS indication) field is set to 4095, and the spatial reuse basic service set indication (SR BSS indication) field is considered as a start part of the padding part. For a conventional node, for example, a node supporting IEEE 802.11ax, when the conventional node reads that the AID 12=4095, the conventional node considers all information following the AID 12 as padding data. In other words, after the information is considered as the padding data, the conventional node cannot read the spatial reuse group indication. However, for a node supporting the technical solutions in this application, if restricted SR in the common information (common info) is 0, the node considers all parts following the AID 12=4095 as padding data. If restricted SR is 1, the node considers a start part of a padding part corresponding to the AID 12=4095 as the spatial reuse basic service set indication (SR BSS indication) field, and considers a following part as the real padding part. Optionally, the spatial reuse basic service set indication (SR BSS indication) field may further include an indication of a quantity of basic service sets (BSS number).

Solution 2: The AID of the spatial reuse basic service set indication (SR BSS indication) field is set to 4095. A difference between Solution 1 and Solution 2 is that, two 4905s are set in the padding part in Solution 2, while only one 4095 is set in Solution 1. For a node supporting the technical solutions in this application, if restricted SR in the common information (common info) is 0, after the node identifies for a first time that the AID 12=4095, the node considers all parts following the AID 12 field as padding data. In other words, after all the parts are considered as the padding data, the node cannot read the spatial reuse group indication. If restricted SR is 1, when the node identifies for a first time that the AID 12=4095, the node considers the AID 12 as a start of the SR BSS indication field, and reads indication information in the SR BSS indication field. The node considers, as an end of the SR BSS indication field, a location of identifying for a second time that the AID 12=4095. The node ends reading the SR BSS indication field, and considers, as the real padding data part, a part following the second time of identifying that the AID 12=4095.

With reference to the trigger frame shown in FIG. 3A, possible specific implementation steps in this embodiment of this application are as follows:

301. A primary access point (primary AP) sends a trigger frame. The trigger frame carries a restricted SR bit. The restricted SR bit is used to indicate whether a station receiving the trigger frame can participate in this time of spatial reuse. In addition, an optional field: an SR BSS indication is newly added to a padding field following user information (User Info) of the trigger frame. The primary access point (primary AP) is the foregoing first access point. The primary access point (primary AP) in this specification is the first access point. Details are not described in the following.

302. After receiving the trigger frame sent by the primary access point (primary AP), an OBSS station checks the restricted SR bit in the trigger frame. If the restricted SR bit is 0, the station performs an SRP-based SR procedure according to IEEE 802.11ax. For a specific procedure, refer to the foregoing description of FIG. 1B. If the restricted SR bit is 1, the station continues to check whether the SR BSS indication field includes information about a basic service set (BSS) to which the station belongs. If the SR BSS indication field includes the information, the station participates in this time of SR. If the SR BSS indication field does not include the information, the station does not participate in this time of SR.

For example, if the restricted SR bit of the trigger frame sent by the primary access point is 1, and the SR BSS indication field indicates the basic service set 2 and the basic service set 3 in FIG. 1A, the stations in the basic service set 2 and the basic service set 3 can participate in this time of SR, and the stations in the basic service set 4 and the basic service set 5 do not participate in this time of SR.

In this embodiment of this application, the trigger frame shown in FIG. 3A is used, to reduce resource overheads and improve transmission efficiency. In addition, efficient parallel transmission can be implemented by using a flexible grouping function.

Figure 3B:
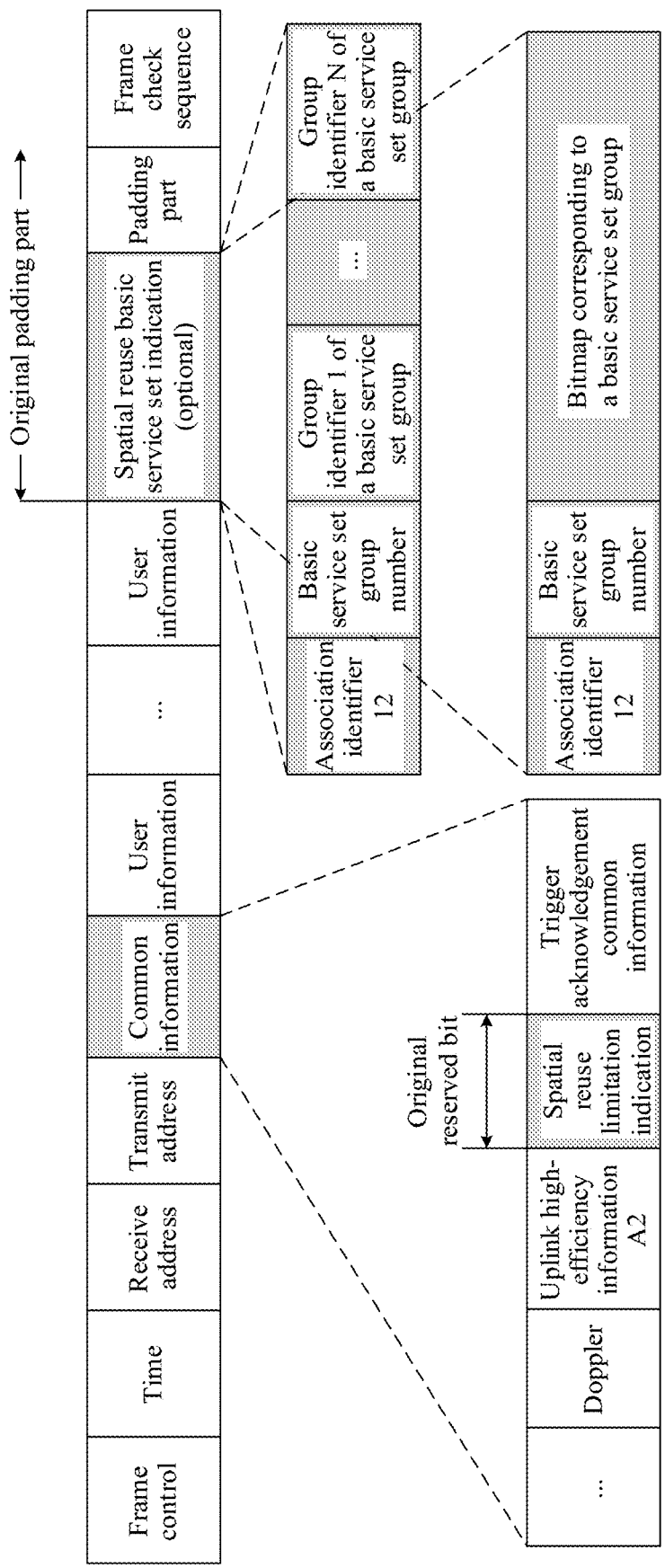
FIG. 3B is a schematic structural diagram of another trigger frame according to an embodiment of this application.

An embodiment of this application further provides a frame structure of a trigger frame shown in FIG. 3B. The frame structure of the trigger frame is similar to the frame structure corresponding to FIG. 3A. FIG. 3B is a schematic diagram of a frame structure of another trigger frame according to an embodiment of this application. A difference between the frame structure shown in FIG. 3A and the frame structure shown in FIG. 3B is that the SR BSS indication field includes group identifiers of a plurality of basic service set groups (BSS group ID list) or bitmaps corresponding to a plurality of basic service set groups (BSS group bitmap).

In the frame structure of the trigger frame corresponding to FIG. 3B, grouping information of the spatial reuse group is negotiated in advance. Specifically, basic service sets BSSs are divided into several basic service set groups (BSS group) in advance. For an access point and a station, a specific basic service set included in each basic service set group is known in advance. Therefore, the SR BSS indication field needs to carry only the group identifier corresponding to the basic service set group or the bitmap corresponding to the basic service set group, to implement a function of the spatial reuse group indication. Optionally, the spatial reuse basic service set indication field in FIG. 3B may further include a quantity of basic service set groups (BSS group number).

It should be noted that other related descriptions and corresponding specific implementation procedures of the frame structure in FIG. 3B are similar to the related descriptions of the corresponding parts in FIG. 3A. Details are not described herein again.

It should be understood that, in comparison with the frame structure shown in FIG. 3A, the trigger frame in FIG. 3B implements a function of indicating the spatial reuse group by using the group identifier or the bitmap corresponding to the basic service set group. The group identifier or the bitmap corresponding to one basic service set group may indicate a plurality of basic service sets, to reduce resource overheads.

Figure 4:
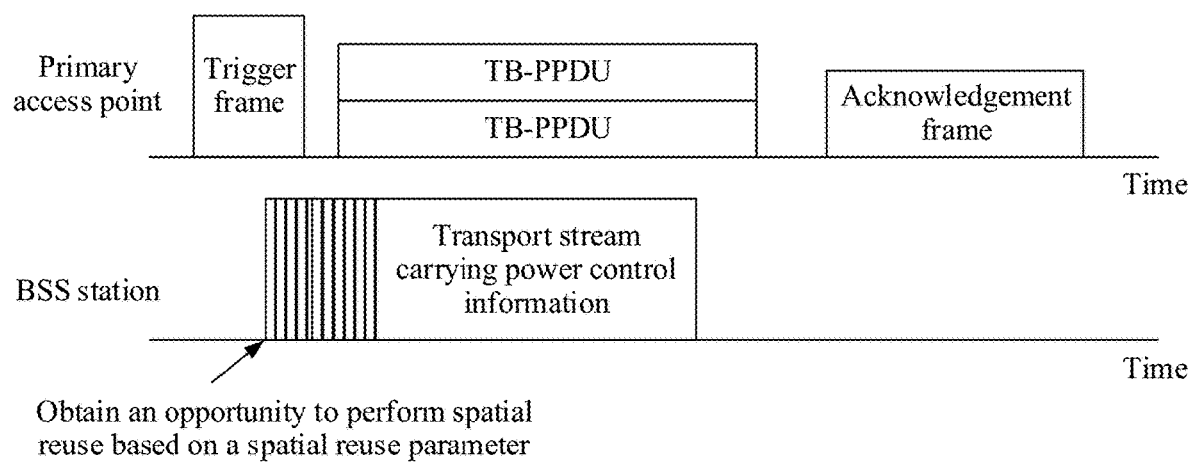
FIG. 4 is a schematic diagram of a time sequence in a spatial reuse method according to an embodiment of this application.

FIG. 4 is a schematic diagram of a time sequence in a spatial reuse method according to an embodiment of this application. In FIG. 4, a primary access point can schedule only one basic service set to perform spatial reuse based on a spatial reuse parameter.

As shown in FIG. 4, the following steps are included:

(1) The primary access point sends a trigger frame. The trigger frame is used to indicate that only a node in a BSS whose BSS color is 6 is allowed to perform spatial reuse based on the spatial reuse parameter. After sending the trigger frame, the primary access points sends a physical protocol data unit (PPDU) corresponding to the BSS, for example, a TB-PPDU in FIG. 4. After transmission of the TB-PPDU is completed, the primary access point sends an acknowledgment frame.

(2) After receiving the trigger frame, the station in the BSS whose BSS color is 6 obtains an opportunity of performing spatial reuse based on the spatial reuse parameter. The station in the BSS whose BSS color is 6 sends a transport stream carrying power control information and that is of an access point in the BSS whose BSS color is 6.

In FIG. 3A and FIG. 3B, the frame format of the trigger frame is improved, so that the trigger frame carries the two pieces of indication information: the spatial reuse limitation indication and the spatial reuse group indication.

The following describes in detail the spatial reuse indication method in this application from a perspective of improving the frame format of the management frame to carry the spatial reuse group indication, and improving the frame format of the trigger frame to carry the spatial reuse limitation indication.

Figure 5:
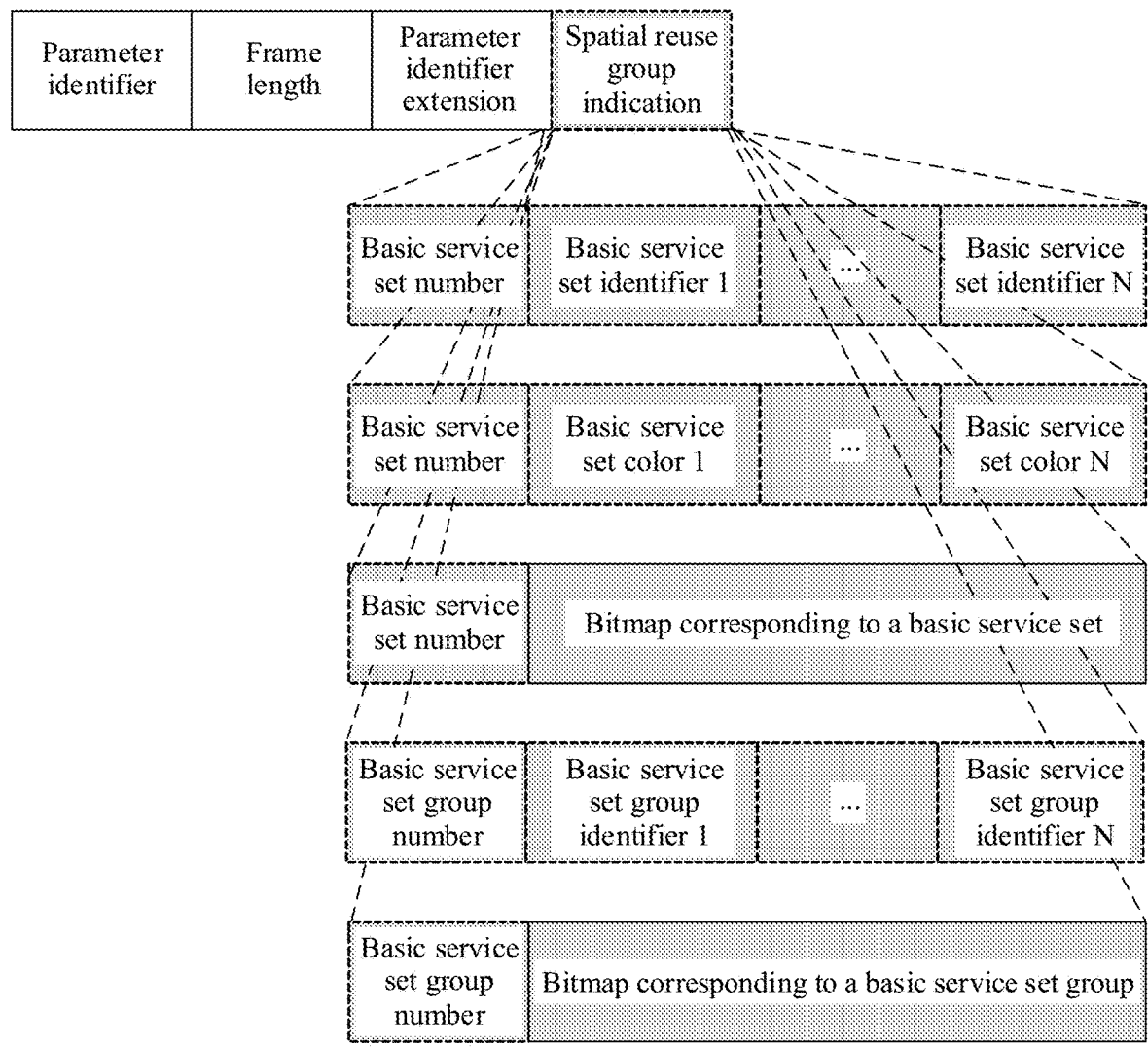
FIG. 5 is a schematic structural diagram of a spatial reuse set element frame according to an embodiment of this application.
Figure 6:
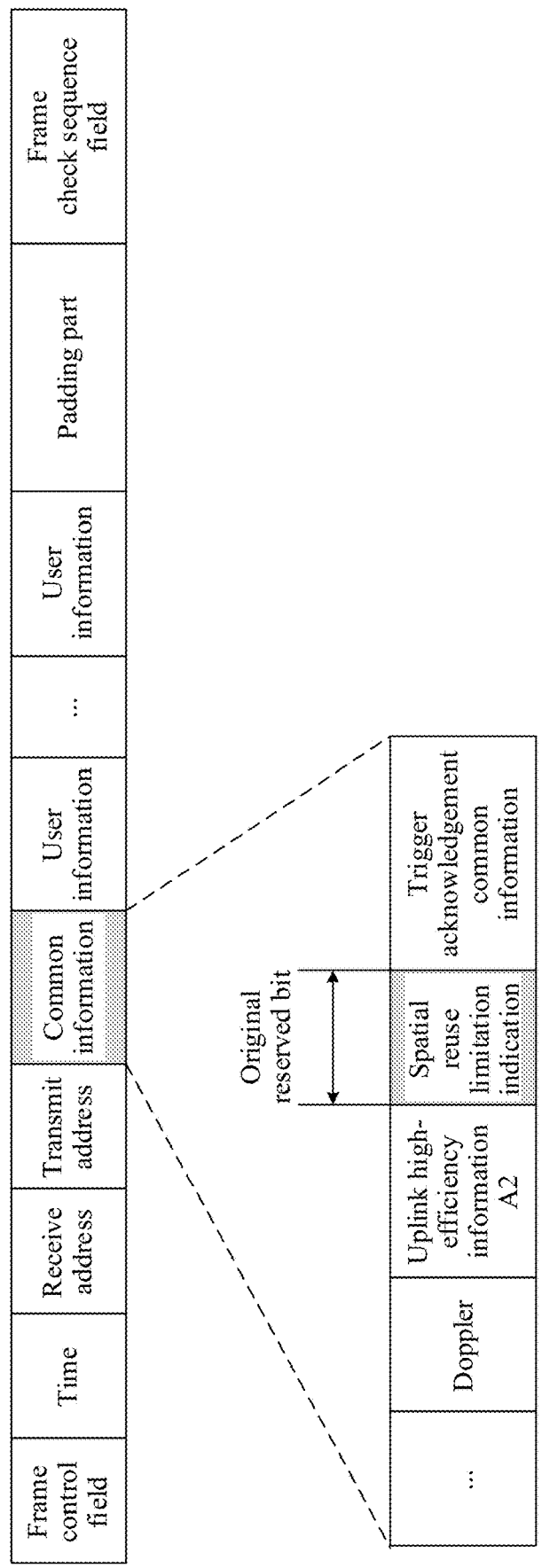
FIG. 6 is a schematic structural diagram of another trigger frame according to an embodiment of this application.

In a second information carrying manner, the spatial reuse limitation indication is carried in a management frame, and the spatial reuse group indication is carried in a trigger frame. FIG. 5 is a schematic diagram of a frame structure of a management frame according to an embodiment of this application. FIG. 6 is a schematic diagram of a frame structure of another trigger frame according to an embodiment of this application.

FIG. 5 shows a newly designed management frame in this application, so that the spatial reuse group indication is carried in a corresponding spatial reuse set element. In this application, this management frame is referred to as a spatial reuse set element frame (SRP set element frame). A spatial reuse parameter set element frame in FIG. 5 includes a parameter identifier (element ID), a frame length (length), a parameter identifier extension (element ID extension), and a spatial reuse group indication field. When the range of nodes in spatial reuse is not limited to the spatial reuse group, the value of the spatial reuse group indication field is 0. When the range of nodes in spatial reuse is limited to the spatial reuse group, the value of the spatial reuse group indication field is not 0. For example, the spatial reuse group indication field includes: an identifier of one or more basic service sets, a color of one or more basic service sets, a bitmap corresponding to one or more basic service sets, a group identifier corresponding to one or more basic service set groups, or a bitmap corresponding to one or more basic service set groups. Further, optionally, the spatial reuse group indication field may further include a corresponding quantity of basic service sets or a corresponding quantity of basic service set groups. It should be noted that the spatial reuse group indication field in FIG. 5 may be specifically the spatial reuse basic service set indication (SR BSS indication) field in FIG. 3A and FIG. 3B. For related descriptions, refer to the descriptions in FIG. 3A and FIG. 3B. Details are not described herein again.

FIG. 6 shows a trigger frame used to carry a spatial reuse limitation indication according to an embodiment of this application. Therefore, in the trigger frame shown in FIG. 6, one reserved bit in common information (common info) is used as the spatial reuse limitation indication (restricted SR) based on an existing trigger frame. In addition, when the reserved bit is 1, it indicates that the range of nodes in spatial reuse is the station in the spatial reuse group. When the reserved bit is 0, it indicates that the range of nodes in spatial reuse is not limited to the station in the spatial reuse group.

With reference to the spatial reuse set element frame shown in FIG. 5 and the trigger frame shown in FIG. 6, a specific embodiment procedure is as follows:

(1) A primary access point AP first sends the spatial reuse set element frame, and then sends the trigger frame. As shown in FIG. 5, the spatial reuse set element frame is used to carry the spatial reuse group indication. As shown in FIG. 6, the trigger frame is used to carry the spatial reuse limitation indication.

(2) After receiving the trigger frame shown in FIG. 6, a BSS station checks a value of restricted SR. If the value is 0, the station performs an SRP-based SR procedure according to IEEE802.11ax. If the value is 1, the station checks whether a basic service set to which the station belongs to the basic service set indicated by the spatial reuse group indication field. If the basic service set to which the station belongs to the basic service set indicated by the spatial reuse group indication field, the station determines to participate in this time of SR. If the basic service set to which the station belongs does not belong to the basic service set indicated by the spatial reuse group indication field, the station determines not to participate in this time of SR.

In a third information carrying manner, the spatial reuse limitation indication and the spatial reuse group indication are carried in a management frame.

Figure 7:
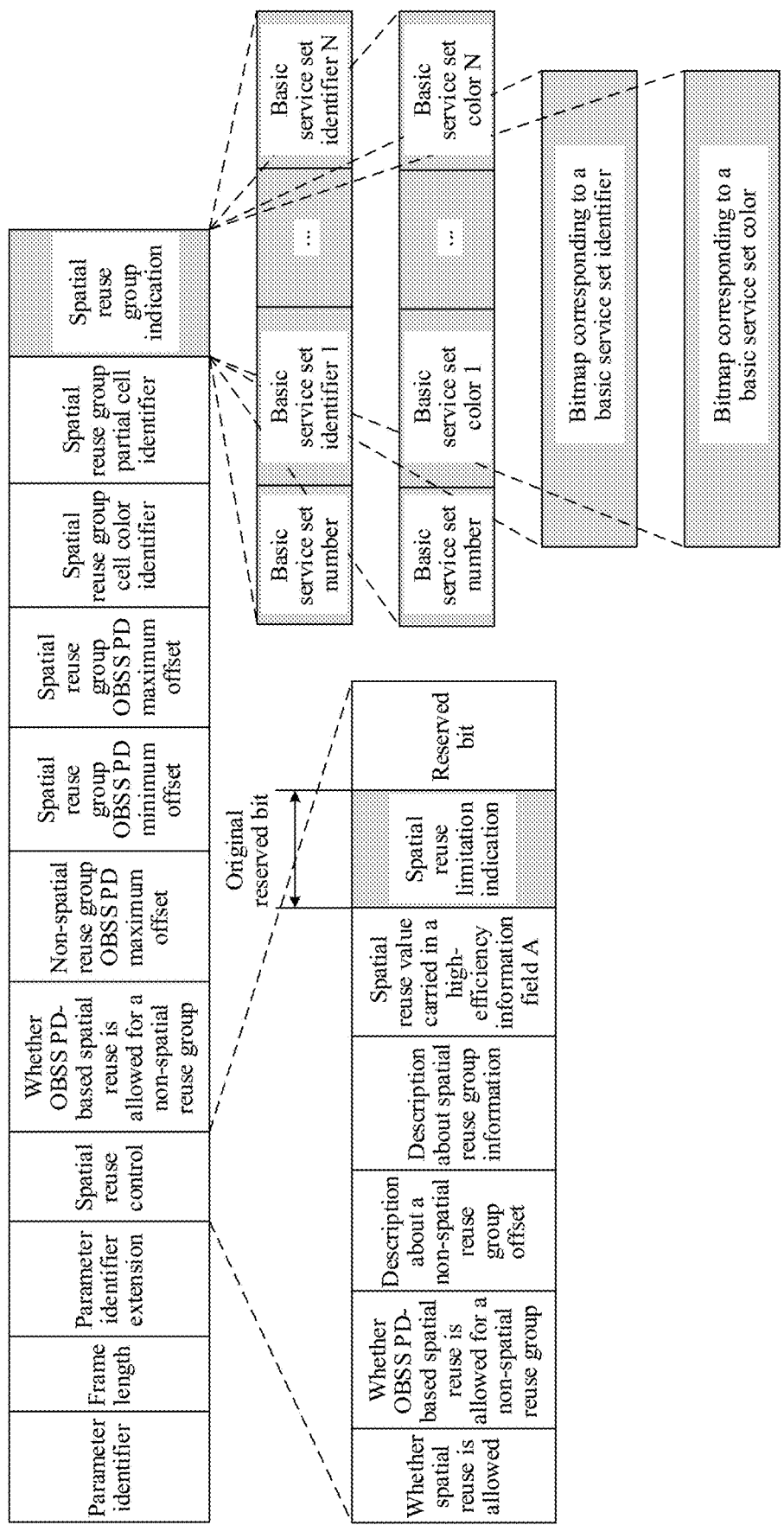
FIG. 7 is a schematic structural diagram of another spatial reuse set element frame according to an embodiment of this application.

In addition to the frame structures in FIG. 3A to FIG. 6, the spatial reuse indication method in this application may further use a spatial reuse set element frame (SRP set element frame) shown in FIG. 7, so that the spatial reuse limitation indication and the spatial reuse group indication are both carried in the management frame for sending. FIG. 7 is a schematic diagram of a frame structure of another spatial reuse set element frame (SRP set element frame) according to an embodiment of this application. Different from the spatial reuse set element frame shown in FIG. 5, the spatial reuse set element frame in FIG. 7 is obtained after a spatial reuse set element frame in existing IEEE 802.11ax is improved. The improvement manner is similar to or the same as the improvement manner of the trigger frame shown in FIG. 3A. A reserved bit occupied by a spatial reuse limitation indication (restricted SR) bit in FIG. 7 is located in a spatial reuse control (SR control) field in the spatial reuse set element frame in existing IEEE 802.11ax. An existing spatial reuse control (SR control) field includes three reserved bits, and restricted SR may occupy one of the three bits. It should be noted that the improvement manner of the spatial reuse set element frame in FIG. 7 is similar to the improvement manner of the trigger frame in FIG. 3A. For related descriptions, refer to the related descriptions in FIG. 3A. This is not limited herein.

It should be noted that, the frame in FIG. 7 is used to notify the station whether the station is within the limited range of spatial reuse. For example, if the station is within the limited range of spatial reuse, after receiving the corresponding trigger frame, the station further needs to determine whether to perform spatial reuse. The trigger frame may use a structure of a trigger frame in the existing IEEE 802.11ax standard.

It should be further noted that the spatial reuse set element frame in FIG. 7 cannot only support SRP-based SR, but also support OBSS_PD-based SR. As shown in FIG. 7, a spatial reuse group cell color identifier (SRG BSS group color bitmap) field and a spatial reuse group partial cell identifier (SRG partial BSSID bitmap) field are for describing how an SR group is established through OBSS_PD. The foregoing two fields: the SRG BSS group color bitmap field and the SRG partial BSSID bitmap field are properly set, so that only a BSS in the SR group is allowed to execute a loose SR policy (for example, OBSS_PD-based SR), that is, a spatial reuse group OBSS_PD minimum offset (SRG OBSS PD min offset) parameter and a spatial reuse group OBSS_PD maximum offset (SRG OBSS PD max offset) parameter are allowed to be used. It should be noted that a manner for setting the two fields: the SRG BSS group color bitmap field and the SRG partial BSSID bitmap field belongs to the prior art. Details are not described in this application.

In addition, the spatial reuse set element frame in FIG. 7 may not only be intercepted by a station in this basic service set BSS, but also be intercepted by a station in another basic service set such as an overlapping basic service set OBSS.

In a second case, a spatial reuse indication method corresponding to an application scenario including a station, a first access point in an overlapping basic service set (OBSS) corresponding to the station, and a second access point in a basic service set (BSS) corresponding to the station is described in detail.

Figure 8:
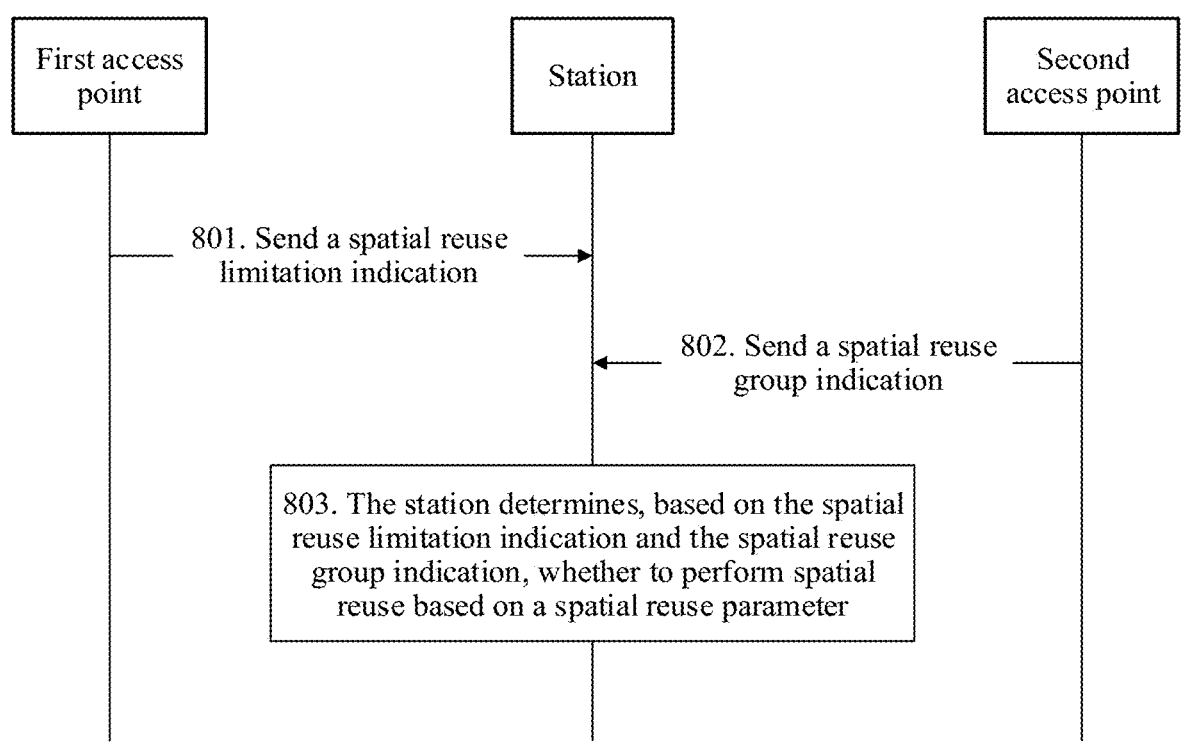
FIG. 8 is a schematic flowchart of another spatial reuse indication method according to an embodiment of this application.

FIG. 8 is a schematic flowchart of a spatial reuse indication method according to an embodiment of this application.

The spatial reuse indication method provided in this embodiment of this application includes the following steps:

801. The first access point sends a spatial reuse limitation indication to the station.

The spatial reuse limitation indication is generated by the first access point. The spatial reuse limitation indication is used to indicate whether only a node in a spatial reuse group is allowed for spatial reuse. This is similar to step 201. It should be understood that a function of the spatial reuse limitation indication is to limit a range of nodes in spatial reuse. For example, the limited range of nodes in spatial reuse is limited to only a node in the spatial reuse group. Alternatively, the limited range of nodes in spatial reuse may be a node in the spatial reuse group or a node outside the spatial reuse group, that is, the range of nodes in spatial reuse is not limited to only the node in the spatial reuse group. It should be noted that the "spatial reuse limitation indication" is merely a name and may also be under another name, for example, a "first indication".

Optionally, in an implementation, the spatial reuse limitation indication is carried in a reserved bit in a common information field in a trigger frame for sending.

Optionally, in an implementation, the spatial reuse limitation indication is used to indicate whether to limit the range of nodes in spatial reuse. This function may be implemented based on a value of the spatial reuse limitation indication. Specifically, if the spatial reuse limitation indication is a first value, it indicates that the range of nodes in spatial reuse is limited, that is, indicates that only the node in the spatial reuse group is allowed for spatial reuse; or if the spatial reuse limitation indication is a second value, it indicates that the range of nodes in spatial reuse is not limited. In other words, when the station performs spatial reuse, the station does not need to consider whether the spatial reuse group exists, or does not need to consider whether the station is in the spatial reuse group or outside the spatial reuse group. In other words, nodes in an OBSS can all perform spatial reuse. Further, a representation form of the spatial reuse limitation indication may be stored in a form of one bit or a plurality of bits. Optionally, in an implementation, the spatial reuse limitation indication is stored by using one bit. For example, the first value corresponding to the spatial reuse limitation indication is 1, and the second value corresponding to the spatial reuse limitation indication is 0.

802. The second access point sends a spatial reuse group indication to the station.

The spatial reuse group indication is generated by the second access point. The second access point is an access point different from the first access point. The spatial reuse group indication is used to indicate the spatial reuse group. The spatial reuse group includes one or more basic service sets. This is similar to step 201. The "spatial reuse group indication" is merely a name and may also be under another name, for example, a "second indication".

Optionally, in an implementation, the spatial reuse group indication may be carried in a management frame different from the trigger frame described in step 801 for sending.

Optionally, in an implementation, an indication manner of the spatial reuse group indication may be implemented by using an identifier (BSS ID) of the one or more basic service sets included in the spatial reuse group, or may be implemented by using a color (BSS color) of the one or more basic service sets included in the spatial reuse group, or may be implemented by using a bitmap (BSS bitmap) corresponding to the one or more basic service sets included in the spatial reuse group. As shown in FIG. 1A, the spatial reuse group includes the five basic service sets shown in FIG. 1A, and the spatial reuse group indication may include at least one of a BSS ID, a BSS color, or a BSS bitmap corresponding to each of the basic service set 1 to the basic service set 5.

In addition, the basic service sets may be grouped in advance to obtain the basic service set group that is denoted as a BSS group. For example, the five basic service sets shown in FIG. 1A are divided into two basic service set groups. A first basic service set group (BSS group1) includes the basic service set 1 and the basic service set 2, and a second basic service set group (BSS group2) includes the basic service set 3, the basic service set 4, and the basic service set 5.

In an example, an indication manner of the spatial reuse group indication may be further implemented by using at least one of a group identifier (BSS group ID) of one or more basic service set groups or a bitmap (BSS group bitmap) corresponding to one or more basic service set groups. For example, the spatial reuse group indication may include a group identifier of the first basic service set group (BSS group1 ID), or the spatial reuse group indication includes a bitmap corresponding to the first basic service set group (BSS group1 bitmap), to indicate that the spatial reuse group includes the basic service set 1 and the basic service set 2.

It should be noted that, in this embodiment of this application, the spatial reuse group indication may be stored by using a plurality of bits or a plurality of bytes. This is not limited in this application.

It should be noted that, in this embodiment of this application, the spatial reuse group indication may be stored by using a plurality of bits or a plurality of bytes. This is not limited in this application. A sequence of step 801 and step 802 may be switched. Step 801 may be performed before step 802. Alternatively, step 802 may be performed before step 801.

803. The station determines, based on the spatial reuse limitation indication and the spatial reuse group indication, whether to perform spatial reuse based on a spatial reuse parameter.

The station may be a station that belongs to the same basic service set as the second access point. The station and the first access point do not belong to the same basic service set.

After receiving the spatial reuse limitation indication sent by the first access point and the spatial reuse group indication sent by the second access point, the station determines, based on the two indications, whether the station can perform spatial reuse SR based on the spatial reuse parameter SRP.

If the spatial reuse limitation indication is a first value, and the basic service set to which the first access point belongs is included in the one or more basic service sets indicated by the spatial reuse group indication, the station performs spatial reuse based on the spatial reuse parameter. If the spatial reuse limitation indication is a first value, and the basic service set to which the first access point belongs is not included in the one or more basic service sets indicated by the spatial reuse group indication, the station does not perform spatial reuse based on the spatial reuse parameter. If the spatial reuse limitation indication is a second value, the station does not perform spatial reuse based on the spatial reuse parameter, regardless of whether the basic service set to which the first access point belongs is included in or not included in the one or more basic service sets indicated by the spatial reuse group indication.

Specifically, in this embodiment, the spatial reuse limitation indication comes from the first access point in the basic service set different from the basic service set to which the station belongs, and the spatial reuse group indication comes from the second access point in the basic service set the same as the basic service set to which the station belongs. Therefore, the station determines a value of the spatial reuse limitation indication. If the spatial reuse limitation indication is a second value, the station determines that the station can perform spatial reuse based on the spatial reuse parameter. Alternatively, if the spatial reuse limitation indication is a first value, the station determines whether the basic service set to which the first access point belongs is included in the one or more basic service sets indicated by the spatial reuse group indication. If the basic service set to which the first access point belongs is included in the one or more basic service sets indicated by the spatial reuse group indication, the station further determines that the station can perform spatial reuse based on the spatial reuse parameter. If the basic service set to which the first access point belongs is not included in the one or more basic service sets indicated by the spatial reuse group indication, the station determines that the station cannot perform spatial reuse. Optionally, the first value may be "1", and the second value may be "0".

It should be noted that for a specific operation of spatial reuse based on the spatial reuse parameter, refer to the general procedure corresponding to FIG. 1B. Details are not described herein again.

The following describes in detail the spatial reuse indication method in this application with reference to the manners for carrying the spatial reuse limitation indication and the spatial reuse group indication in step 801 and step 802.

Figure 9:
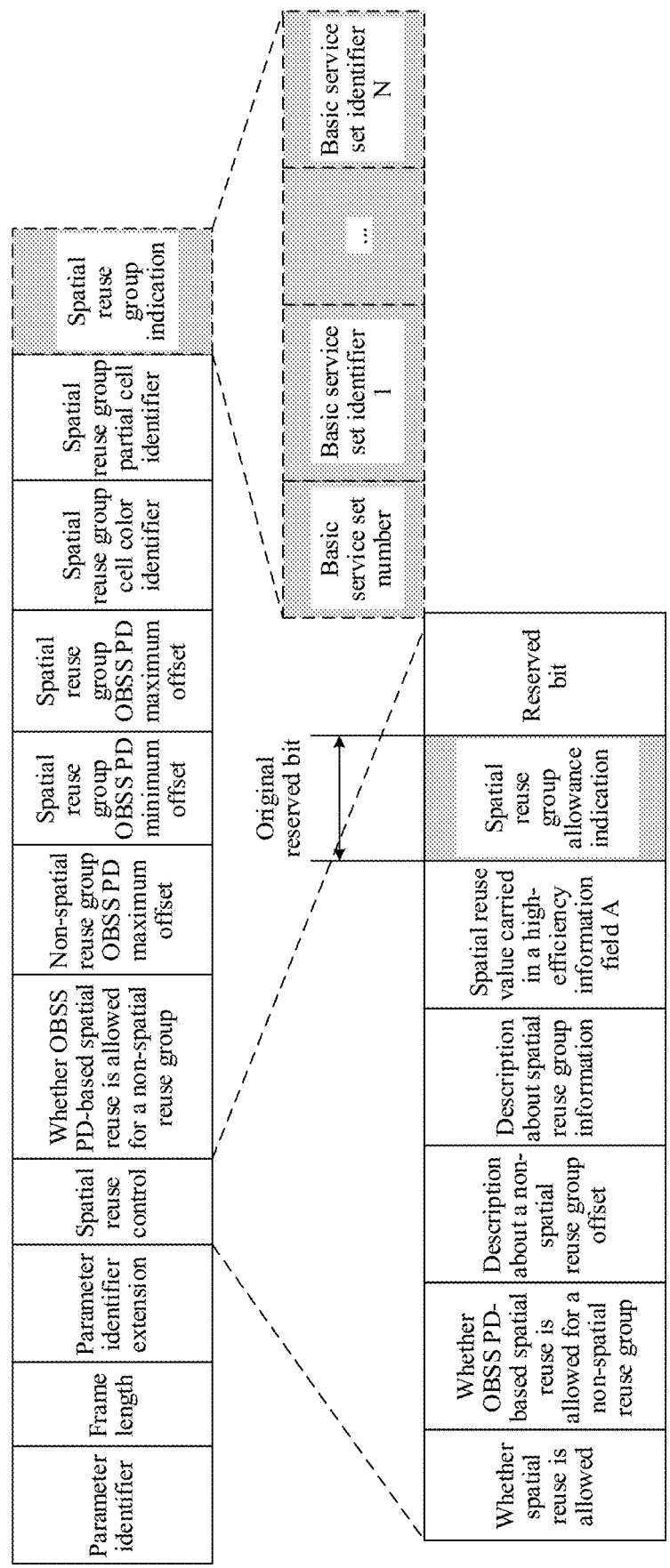
FIG. 9 is a schematic structural diagram of another spatial reuse set element frame according to an embodiment of this application.

FIG. 9 is a schematic structural diagram of another spatial reuse set element frame according to an embodiment of this application.

As shown in FIG. 9, the spatial reuse set element frame provided in this embodiment of this application reuses a spatial reuse set frame structure in the existing IEEE 802.11ax standard. In comparison, an improvement part is that, optionally, a spatial reuse group allowance indication is set in a reserved bit in a spatial reuse control (SR control) field in the spatial reuse set frame structure, and is denoted as SRP group present. Herein, SRP group present is used to indicate whether a spatial reuse basic service set indication (SR BSS indication) field exists. When a value of SRP group present is 1, it indicates that the SR BSS indication field exists in the spatial reuse set frame structure. If a value of SRP group present is 0, it indicates that the SR BSS indication field does not exist in the spatial reuse set frame structure. For a function and a related description of the SR BSS indication field, refer to the related description of the SR BSS indication field in FIG. 3A. Details are not described herein again. It should be understood that, when the value of SRP group present is 0, it indicates that SR is SRP-based SR in the existing IEEE 802.11ax standard; or if the value of SRP group present is 1, it indicates that SR is SRP-based SR limited in the SRP group in this application.

In addition, the first access point uses the spatial reuse set frame structure shown in FIG. 9 to carry the spatial reuse group indication, and the second access point may use the trigger frame structure shown in FIG. 6 to carry the spatial reuse limitation indication.

Figure 10:
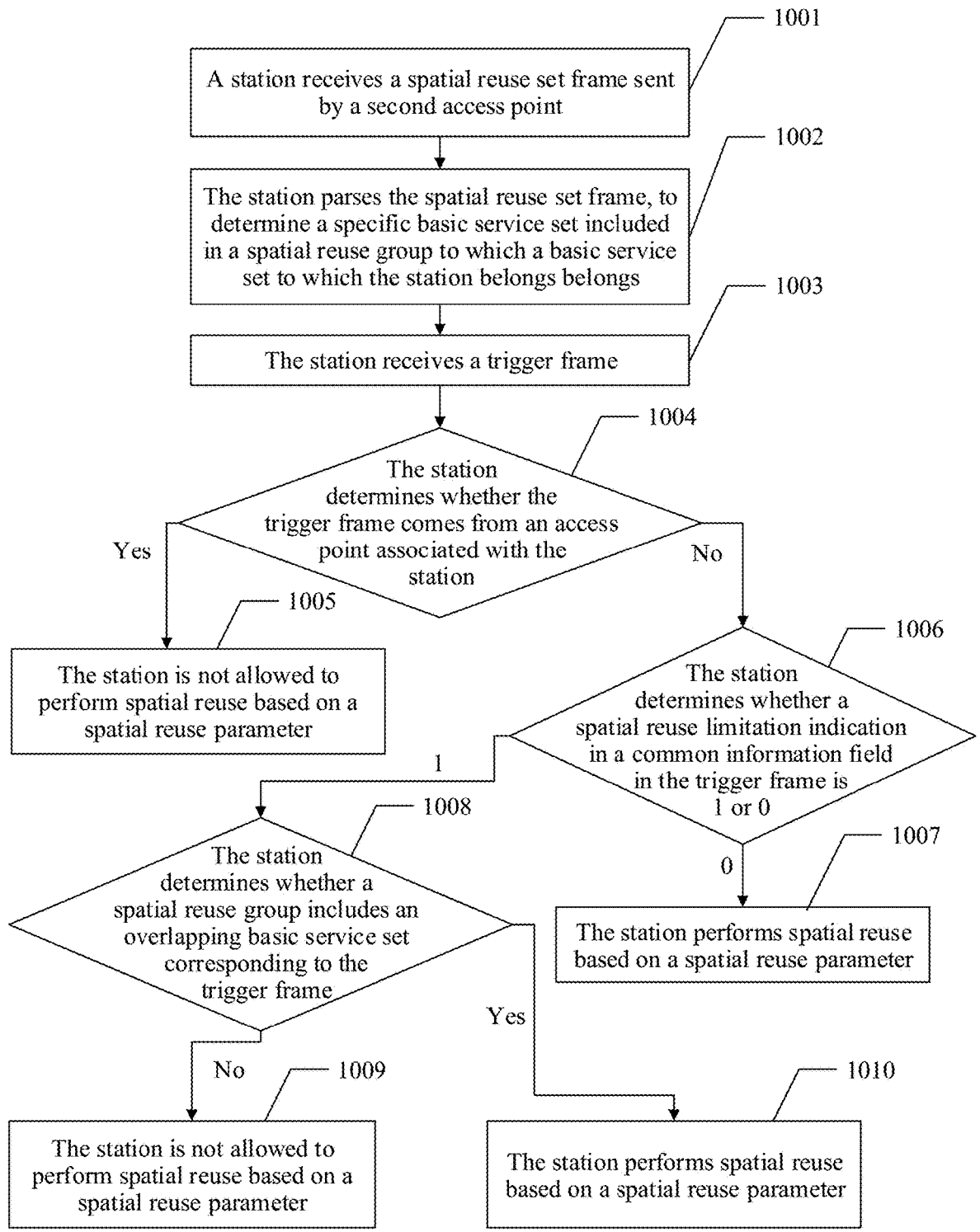
FIG. 10 is a schematic flowchart of a specific embodiment according to an embodiment of this application.

With reference to the frame structures shown in FIG. 6 and FIG. 9, as shown in FIG. 10, a specific implementation procedure in this embodiment of this application includes the following steps:

1001. A station receives a spatial reuse set (spatial reuse set) frame sent by a second access point.

The second access point and the station belong to the same basic service set. A format of the spatial reuse set frame is shown in FIG. 9.

1002. The station parses the spatial reuse set frame, to determine a specific basic service set included in a spatial reuse group (SRP group) to which a basic service set to which the station belongs.

1003. The station receives a trigger frame. A format of the trigger frame is shown in FIG. 6.

1004. The station determines whether the trigger frame comes from an access point associated with the station.

It should be understood that the access point associated with the station is an access point belonging to the same basic service set (BSS) as the station. If the trigger frame comes from the first access point above, this is equivalent to that the trigger frame comes from an overlapping basic service set (OBSS), that is, the first access point is not the access point associated with the station. If the trigger frame comes from the second access point, this is equivalent to that the trigger frame comes from a basic service set to which the station belongs, that is, the second access point is the access point associated with the station.

If the trigger frame comes from the access point associated with the station, step 1005 is performed: The station does not perform spatial reuse based on a spatial reuse parameter.

If the station is a scheduled station, the station makes a scheduling response based on scheduling. If the station is not a scheduled station, the station does not perform any operation.

If the trigger frame comes from the access point associated with the station, step 1006 is performed: The station determines whether a spatial reuse limitation indication (restricted SR) bit in a common information (Common Info) field in the trigger frame is 1 or 0.

If the spatial reuse limitation indication (restricted SR) bit is 0, step 1007 is performed: The station performs spatial reuse based on a spatial reuse parameter.

In an example, the station performs spatial reuse SR based on the spatial reuse parameter SRP according to the existing IEEE 802.11ax standard. For a specific operation, refer to the related description in FIG. 1B.

If the spatial reuse limitation indication SR (restricted SR) bit is 1, step 1008 is performed: The station determines whether the spatial reuse group (SRP group) includes an overlapping basic service set corresponding to the trigger frame. The overlapping basic service set corresponding to the trigger frame indicates a basic service set to which the access point sending the trigger frame belongs.

If the spatial reuse group (SRP group) does not include the overlapping basic service set corresponding to the trigger frame, step 1009 is performed: The station is not allowed to perform spatial reuse (SR) based on a spatial reuse parameter (SRP).

If the spatial reuse group (SRP group) includes the overlapping basic service set corresponding to the trigger frame, step 1010 is performed: The station is allowed to perform spatial reuse (SR) based on a spatial reuse parameter (SRP).

In an example, the station performs spatial reuse SR based on the spatial reuse parameter SRP according to the existing IEEE 802.11ax standard. For a specific operation, refer to the related description in FIG. 1B.

Figure 11:
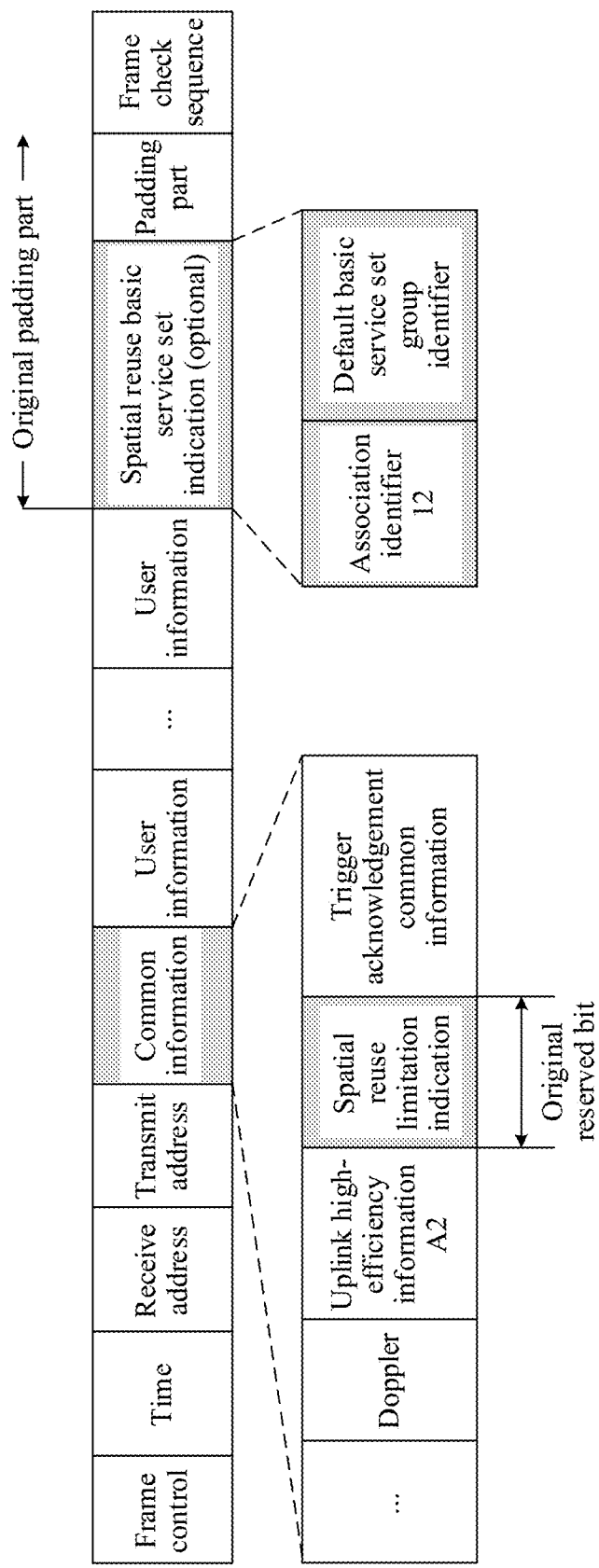
FIG. 11 is a schematic structural diagram of another trigger frame according to an embodiment of this application.

In another embodiment, FIG. 11 is a schematic diagram of a frame structure of another trigger frame according to an embodiment of this application. In comparison with the frame structures corresponding to FIG. 3A and FIG. 3B, a difference of the frame structure corresponding to FIG. 11 is that the spatial reuse basic service set indication (SR BSS indication) field includes a group identifier (BSS group ID) of only one basic service set group. Other related descriptions of the frame structure in FIG. 3B are similar to the related descriptions of the corresponding part in FIG. 3A. Details are not described herein again.

With reference to the trigger frame shown in FIG. 11, possible specific implementation steps in this embodiment of this application are as follows:

1101. A primary access point AP sends a trigger frame. The trigger frame carries a spatial reuse limitation indication (restricted SR) bit. The restricted SR bit is used to indicate whether a station receiving the trigger frame can participate in this time of spatial reuse. In addition, an optional field: a spatial reuse basic service set indication (SR BSS Indication) is newly added after user information (User Info) of the trigger frame. When the SR BSS indication field exists, the SR BSS indication field includes a group identifier corresponding to a default basic service set group.

1102. After receiving the trigger frame sent by the primary access point AP, the station checks the spatial reuse limitation indication (restricted SR) bit in the trigger frame. If the restricted SR bit is 0, the station performs an SRP-based SR procedure according to IEEE 802.11ax. For a specific procedure, refer to the foregoing description of FIG. 1B. If the restricted SR bit is 1, the station continues to check whether the group identifier in the SR BSS indication field is a group identifier of a basic service set group to which the station belongs. If the group identifier in the SR BSS indication field is the group identifier of the basic service set group to which the station belongs, the station participates in this time of SR. If the group identifier in the SR BSS indication field is not the group identifier of the basic service set group to which the station belongs, the station does not participate in this time of SR.

It should be noted that, in comparison with the specific embodiment procedure corresponding to FIG. 10, the primary access point AP in FIG. 11 is equivalent to the first access point, the BSS to which the station belongs is the same as a BSS to which a second access point in FIG. 10 belongs, and a specific BSS included in an SRP group to which the BSS belongs is negotiated between the station and the second access point in advance. Therefore, in the implementation procedure corresponding to FIG. 11, the second access point does not need to send the spatial reuse set element frame (spatial reuse set element frame) shown in FIG. 9 to the station. The foregoing mainly describes the solutions provided in the embodiments of this application from a perspective of interaction between the station and the access point. A person of ordinary skill in the art should easily be aware that, with reference to modules and algorithm steps in the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art can implement the described functions by using different methods with regard to each specific application.

When being described from a hardware structure, the wireless access device or the wireless terminal device in this application may be implemented by using one entity device, or may be implemented by using a plurality of entity devices together, or may be a logical function module in one entity device. This is not specifically limited in this embodiment of this application.

Figure 12:
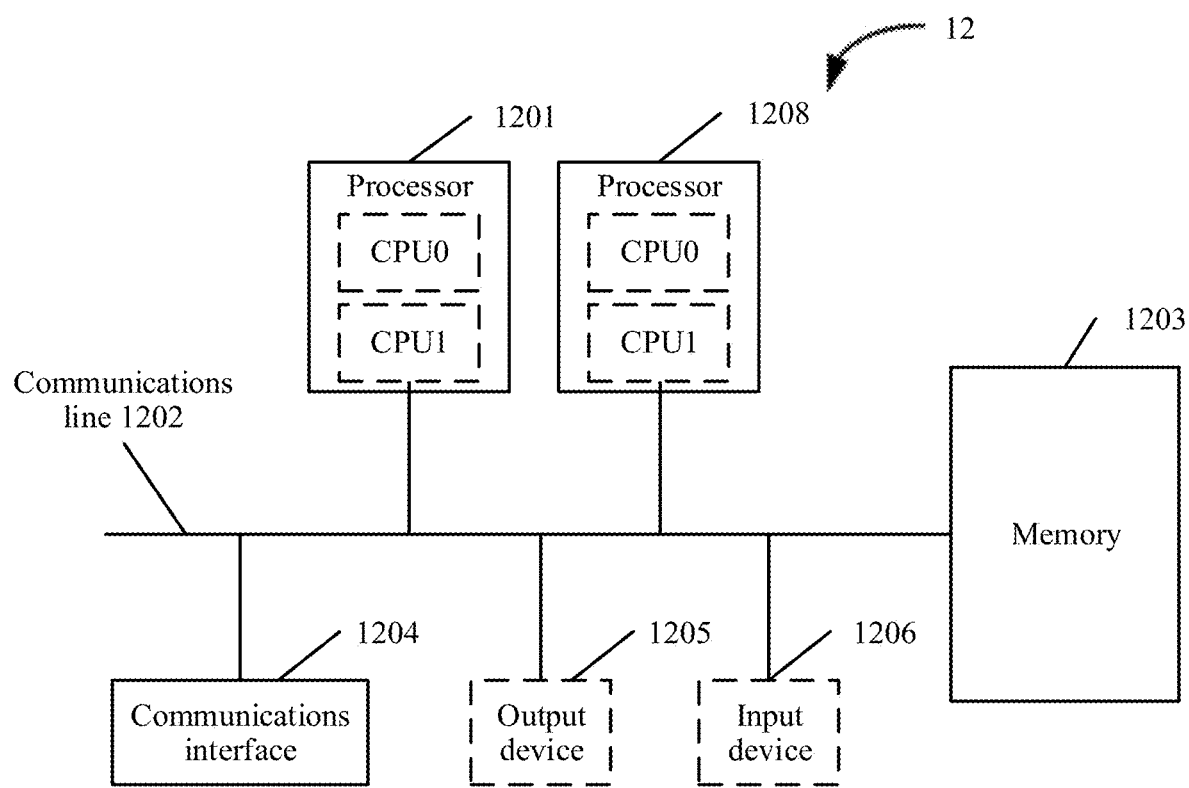
FIG. 12 is a schematic structural diagram of hardware of a communications apparatus according to an embodiment of this application.

In an example, the wireless access device or the wireless terminal device in this application may be implemented by a communications apparatus in FIG. 12. When the communications apparatus serves as the wireless access device, the communications apparatus can implement the method and the function related to the first access point or the second access point in the foregoing embodiments. When the communications apparatus serves as the wireless terminal device, the communications apparatus can implement the method and the function related to the station in the foregoing embodiments. FIG. 12 is a schematic diagram of a hardware structure of a communications apparatus according to an embodiment of this application. The communications apparatus 12 includes at least one processor 1201, a communications line 1202, and at least one communications interface 1204. Optionally, the communications apparatus 12 further includes a memory 1203.

The processor 1201 may be a general purpose central processing unit (CPU), a microprocessor, an application-specific integrated circuit (ASIC), or one or more integrated circuits configured to control program execution of the solutions in this application.

The communications line 1202 may include a path used for transmitting information between the foregoing components.

The communications interface 1204 can be any apparatus such as a transceiver, and is configured to communicate with another device or communication network such as the Ethernet, a radio access network (RAN), or a wireless local area network (WLAN).

The memory 1203 may be a read-only memory (ROM), a static storage device in another type that can store static information and an instruction, a random access memory (RAM), or a dynamic storage device in another type that can store information and an instruction; or may be an electrically erasable programmable read-only memory (EEPROM), a compact disc read-only memory (CD-ROM), or another compact disc storage or optical disc storage (including a compact disc, a laser disc, an optical disc, a digital versatile disc, a Blu-ray disc, and the like), a magnetic disk storage medium, another magnetic storage device, or any other medium that can be used to carry or store desired program code in a form of an instruction or a data structure and that is accessible to a computer. However, the memory 1203 is not limited thereto. The memory 1203 may exist independently and is connected to the processor by using the communications line 1204. Alternatively, the memory may be integrated with the processor.

The memory 1203 is configured to store a computer executable instruction for executing the solutions of this application. The processor 1201 controls the execution. The processor 1201 is configured to execute the computer executable instruction stored in the memory 1203, to implement a function of the wireless access device or the wireless terminal device corresponding to the spatial reuse indication method in the embodiments of this application.

Optionally, the computer executable instruction in this embodiment of this application may also be referred to as application program code. This is not specifically limited in this embodiment of this application.

In specific implementation, in an embodiment, the processor 1201 may include one or more CPUs, for example, a CPU 0 and a CPU 1 in FIG. 12.

In specific implementation, in an embodiment, the communications apparatus 12 may include a plurality of processors, for example, a processor 1201 and a processor 1208 in FIG. 12. Each of the processors may be a single-core (single-CPU) processor, or may be a multi-core (multi-CPU) processor. The processor herein may be one or more devices, circuits, and/or processing cores for processing data (such as a computer program instruction).

In specific implementation, in an embodiment, the communications apparatus 12 may further include an output device 1205 and an input device 1206. The output device 1205 communicates with the processor 1201, and can display information in a plurality of manners. For example, the output device 405 may be a liquid crystal display (LCD), a light emitting diode (LED) display device, a cathode ray tube (CRT) display device, or a projector (projector). The input device 1206 communicates with the processor 1201, and can receive input from a user in a plurality of manners. For example, the input device 1206 may be a mouse, a keyboard, a touchscreen device, or a sensing device.

The communications apparatus 12 may be a general purpose device or a dedicated device. In a specific implementation, the communications apparatus 12 may be a desktop computer, a portable computer, a network server, a palmtop computer (PDA), a mobile phone, a tablet computer, a wireless terminal device, an embedded device, or a device with a structure similar to that in FIG. 12. A type of the communications apparatus 12 is not limited in this embodiment of this application.

In this embodiment of this application, function modules of the wireless access device and the wireless terminal device may be obtained through division based on the foregoing method examples. For example, each function module corresponding to each function may be obtained through division, or two or more functions may be integrated into one processing module. The integrated module may be implemented in a form of hardware, or may be implemented in a form of a software functional module. It should be noted that, in this embodiment of this application, module division is an example, and is merely a logical function division. In actual implementation, another division manner may be used.

Figure 13:
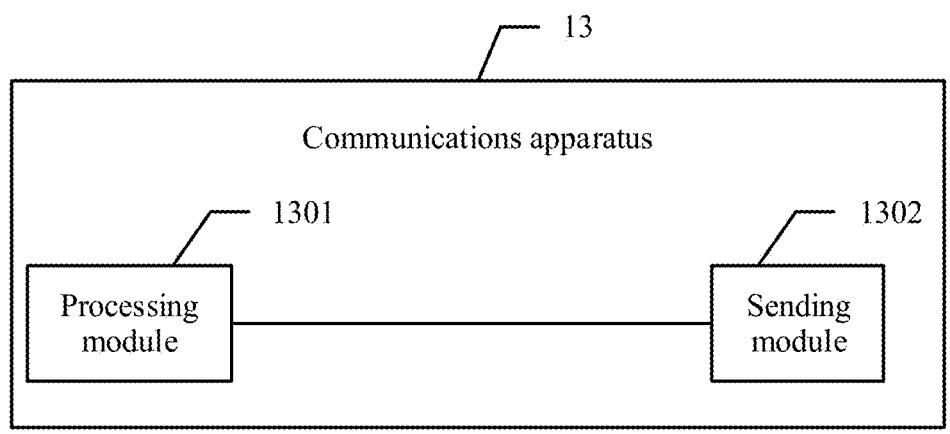
FIG. 13 is a schematic structural diagram of a wireless access device according to an embodiment of this application.

When the wireless access device is divided into the function modules in an integration manner, FIG. 13 is a schematic structural diagram of a communications apparatus. The communications apparatus may be applied to a wireless access device, and may be configured to implement the method and the step of the first access point and the second access point in the foregoing embodiments. The communications apparatus may be a wireless access device, or may be a chip in a wireless access device. As shown in FIG. 13, the communications apparatus 13 includes a processing module 1301 and a sending module 1302.

If the communications apparatus 13 is configured to implement the function of the first access point, the processing module 1301 may be configured to generate a spatial reuse limitation indication and a spatial reuse group indication. The spatial reuse limitation indication is used to indicate whether only a node in a spatial reuse group is allowed for spatial reuse. The spatial reuse group indication is used to indicate the spatial reuse group. The spatial reuse group includes one or more basic service sets. Herein, "more" indicates two or more. The sending module 1302 may be configured to send the spatial reuse limitation indication and the spatial reuse group indication.

If the communications apparatus 13 is configured to implement the function of the first access point, the processing module 1301 may be alternatively configured to generate a spatial reuse limitation indication. The spatial reuse limitation indication is used to indicate whether only a node in a spatial reuse group is allowed for spatial reuse. The sending module 1302 is configured to send the spatial reuse limitation indication.

If the communications apparatus 13 is configured to implement the function of the second access point, the processing module 1301 may be configured to generate a spatial reuse group indication. The spatial reuse group indication is used to indicate a spatial reuse group. The spatial reuse group includes one or more basic service sets. Herein, "more" indicates two or more. The sending module 1302 may be configured to send the spatial reuse group indication.

In a possible implementation, if the spatial reuse limitation indication is a first value, it indicates that only the node in the spatial reuse group is allowed for spatial reuse, and a node outside the spatial reuse group is not allowed for spatial reuse, that is, a range of nodes in spatial reuse is limited by the spatial reuse group; or if the spatial reuse limitation indication is a second value, it indicates that a range of nodes in spatial reuse is not limited by the spatial reuse group, that is, when the station performs spatial reuse, the station does not need to consider whether the spatial reuse group exists, or does not need to consider whether the station is in the spatial reuse group or outside the spatial reuse group.

In a possible implementation, the spatial reuse limitation indication includes one bit. A first value corresponding to the bit is 1, and a second value corresponding to the bit is 0.

In a possible implementation, the spatial reuse group indication includes at least one of the following: an identifier of the one or more basic service sets, a color of the one or more basic service sets, or a bitmap corresponding to the one or more basic service sets. Specifically, the spatial reuse limitation indication may be the identifier of the one or more basic service sets, or the spatial reuse limitation indication may be the color of the one or more basic service sets, or the spatial reuse limitation indication may be the bitmap corresponding to the one or more basic service sets.

In a possible implementation, the one or more basic service sets are included in one or more basic service set groups, and the spatial reuse group indication includes at least one of the following: a group identifier of the one or more basic service set groups, or a bitmap corresponding to the one or more basic service set groups.

All related content of the steps of the first access point and the second access point in the method embodiments corresponding to FIG. 2 to FIG. 11 can be cited in the function descriptions of the corresponding function modules of the communications apparatus 13. Details are not described herein again.

In this embodiment, the wireless access device 13 is presented in a form of function modules obtained through division in an integration manner. The "module" herein may be an application-specific integrated circuit (ASIC), a circuit, a processor that executes one or more software programs or firmware programs, a memory, an integrated logic circuit, and/or another component that can provide the foregoing function. In a simple embodiment, a person skilled in the art may figure out that the wireless access device 13 may be implemented by using a form shown in FIG. 12.

For example, the processor 1201 in FIG. 12 may invoke the computer executable instruction stored in the memory 1203, so that the wireless access device 13 performs the spatial reuse indication method in the method embodiments.

Specifically, the functions/the implementation processes of the processing module 1301 and the sending module 1302 in FIG. 13 may be implemented by the processor 1201 in FIG. 12 through invoking the computer executable instruction stored in the memory 1203. Alternatively, the functions/the implementation processes of the processing module 1301 in FIG. 13 may be implemented by the processor 1201 in FIG. 12 through invoking the computer executable instruction stored in the memory 1203, and the functions/the implementation processes of the sending module 1302 in FIG. 13 may be implemented by using the communications interface 1204 in FIG. 12.

Figure 14:
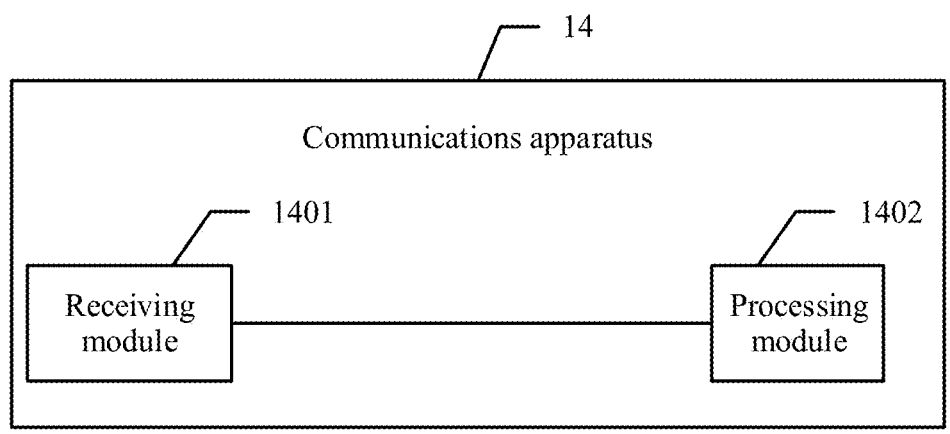
FIG. 14 is a schematic structural diagram of a wireless terminal device according to an embodiment of this application.

In another aspect, when the wireless terminal device is divided into the function modules in an integration manner, FIG. 14 is a schematic structural diagram of another communications apparatus. The communications apparatus may be applied to a wireless terminal device, and may be configured to implement the method and the step of the station in the foregoing embodiments. The communications apparatus may be a wireless terminal device, or may be a chip in a wireless terminal device. As shown in FIG. 14, the communications apparatus 14 includes a receiving module 1401 and a processing module 1402.

The receiving module 1401 may be configured to receive a spatial reuse limitation indication and a spatial reuse group indication. The spatial reuse limitation indication is used to indicate whether only a node in a spatial reuse group is allowed for spatial reuse. The spatial reuse group indication is used to indicate the spatial reuse group. The spatial reuse group includes one or more basic service sets. Herein, the "more basic service sets" indicate two or more basic service sets. The processing module 1402 is configured to determine, based on the received spatial reuse limitation indication and the received spatial reuse group indication, whether to perform spatial reuse based on a spatial reuse parameter.

In a possible implementation, if the spatial reuse limitation indication and the spatial reuse group indication come from a first access point in a basic service set different from a basic service set in which the station is located, the processing module 1402 is specifically configured to: if the spatial reuse limitation indication is a first value, and the basic service set to which the station belongs is included in the one or more basic service sets indicated by the spatial reuse group indication, perform spatial reuse based on the spatial reuse parameter; if the spatial reuse limitation indication is a first value, and the basic service set to which the station belongs is not included in the one or more basic service sets indicated by the spatial reuse group indication, not perform spatial reuse based on the spatial reuse parameter; or if the spatial reuse limitation indication is a second value, not perform spatial reuse based on the spatial reuse parameter, regardless of whether the basic service set to which the station belongs is included in or not included in the one or more basic service sets indicated by the spatial reuse group indication.

In an example, the processing module 1402 is specifically configured to: determine a value of the spatial reuse limitation indication, and if the spatial reuse limitation indication takes a first value, further determine whether the basic service set to which the station belongs is included in the one or more basic service sets indicated by the spatial reuse group indication; or if the spatial reuse limitation indication takes a second value, perform spatial reuse based on the spatial reuse parameter. Further, optionally, the processing module 1402 is specifically configured to: if the basic service set to which the station belongs is included in the one or more basic service sets indicated by the spatial reuse group indication, perform spatial reuse based on the spatial reuse parameter; or if the basic service set to which the station belongs is not included in the one or more basic service sets indicated by the spatial reuse group indication, not perform spatial reuse.

In a possible implementation, if the spatial reuse limitation indication comes from a first access point in a basic service set different from a basic service set to which the station belongs, and the spatial reuse group indication comes from a second access point in a basic service set the same as the basic service set to which the station belongs, the processing module 1402 is specifically configured to: if the spatial reuse limitation indication is a first value, and the basic service set to which the first access point belongs is included in the one or more basic service sets indicated by the spatial reuse group indication, perform spatial reuse based on the spatial reuse parameter; if the spatial reuse limitation indication is a first value, and the basic service set to which the first access point belongs is not included in the one or more basic service sets indicated by the spatial reuse group indication, not perform spatial reuse based on the spatial reuse parameter; or if the spatial reuse limitation indication is a second value, not perform spatial reuse based on the spatial reuse parameter, regardless of whether the basic service set to which the first access point belongs is included in or not included in the one or more basic service sets indicated by the spatial reuse group indication.

In an example, the processing module 1402 is specifically configured to: if the spatial reuse limitation indication is a first value, determine whether the basic service set to which the first access point belongs is included in the one or more basic service sets indicated by the spatial reuse group indication; or if the spatial reuse limitation indication is a second value, perform spatial reuse based on the spatial reuse parameter. Further, optionally, the processing module 1402 is specifically configured to: if the basic service set to which the first access point belongs is included in the one or more basic service sets indicated by the spatial reuse group indication, perform spatial reuse based on the spatial reuse parameter; or if the basic service set to which the first access point belongs is not included in the one or more basic service sets indicated by the spatial reuse group indication, not perform spatial reuse.

All related content of the steps of the station in the method embodiments corresponding to FIG. 2 to FIG. 11 can be cited in the function descriptions of the corresponding function modules of the communications apparatus 14. Details are not described herein again.

In this embodiment, the wireless terminal device 14 is presented in a form of function modules obtained through division in an integration manner. The "module" herein may be an application-specific integrated circuit (application-specific integrated circuit, ASIC), a circuit, a processor that executes one or more software programs or firmware programs, a memory, an integrated logic circuit, and/or another component that can provide the foregoing function. In a simple embodiment, a person skilled in the art may figure out that the wireless terminal device 14 may be implemented by using a form shown in FIG. 12.

For example, the processor 1201 in FIG. 12 may invoke the computer executable instruction stored in the memory 1203, so that the wireless terminal device 14 performs the spatial reuse indication method in the method embodiments.

Specifically, the functions/the implementation processes of the processing module 1402 and the receiving module 1401 in FIG. 14 may be implemented by the processor 1201 in FIG. 12 through invoking the computer executable instruction stored in the memory 1203. Alternatively, the functions/the implementation processes of the processing module 1402 in FIG. 14 may be implemented by the processor 1201 in FIG. 12 through invoking the computer executable instruction stored in the memory 1203, and the functions/the implementation processes of the receiving module 1401 in FIG. 14 may be implemented by using the communications interface 1204 in FIG. 12.

An embodiment of this application further provides a chip system. The chip system includes a processor, configured to support a wireless access device in performing the foregoing spatial reuse indication method, or configured to support a wireless terminal device in performing the foregoing spatial reuse indication method. In a possible design, the chip system further includes a memory. The memory is configured to store a program instruction and data required by the wireless access device or the wireless terminal device. The chip system may include a chip, or may include a chip and another discrete device. This is not specifically limited in this embodiment of this application.

It should be noted that the "send" action in the foregoing embodiment may also be "provide" or "output", and the "receive" action may also be "obtain" or "input".

All or some of the foregoing embodiments may be implemented by using software, hardware, firmware, or any combination thereof. When software is used to implement the embodiments, the embodiments may be implemented completely or partially in a form of a computer program product.

The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State drive (SSD)), or the like.

A person of ordinary skill in the art may understand that all or some of the steps of the methods in the embodiments may be implemented by a program instructing related hardware. The program may be stored in a computer readable storage medium. The storage medium may include: a ROM, a RAM, a magnetic disk, an optical disc, or the like.

The term "and/or" in this application describes only an association relationship for describing associated objects and represents that three relationships may exist. For example, A and/or B may represent the following three cases: Only A exists, both A and B exist, and only B exists. In addition, the character "/" in this application generally indicates an "or" relationship between the associated objects.

In the specification, claims, and accompanying drawings of this application, the terms "first", "second", and so on are intended to distinguish between similar objects but do not necessarily indicate a specific order or sequence. It should be understood that the data termed in such a way is interchangeable in proper circumstances so that the embodiments of the present invention described herein can be implemented in other orders than the order illustrated or described herein. Moreover, the terms "include", "contain", and any other variants mean to cover the non-exclusive inclusion, for example, a process, method, system, product, or device that includes a list of steps or modules is not necessarily limited to those modules, but may include other modules not expressly listed or inherent to such a process, method, system, product, or device. Naming or numbering the steps in this application does not mean that the steps in the method procedure are necessarily to be performed in a time/logic sequence indicated by the naming or numbering. A sequence for performing a named or numbered step in a procedure may be changed based on a to-be-implemented technical purpose, provided that a same or similar technical effect can be achieved. Division of modules in this application is logical division. In actual application, there may be another division manner during implementation. For example, a plurality of modules may be combined or integrated in another system, or some features may be ignored or not performed. In addition, the displayed or discussed mutual coupling or direct coupling or communication connection may be implemented by using some interfaces, and the indirect coupling or communication connection between the modules may be in an electrical or another similar form. This is not limited in this application. In addition, modules or sub-modules described as separate components may be or may not be physically separated, or may be or may not be physical modules, or may not be grouped into a plurality of circuit modules. Objectives of the solutions of this application may be achieved by selecting some or all of the modules according to actual requirements.

The spatial reuse indication method and the wireless communications apparatus provided in the embodiments of this application are described in detail above. The principle and implementation of this application are described in this specification through specific examples. The description about the embodiments of this application is merely provided to help understand the method and core ideas of this application. In addition, a person of ordinary skill in the art can make variations and modifications to this application in terms of the specific implementations and application scopes according to the ideas of this application. Therefore, the content of specification shall not be construed as a limit to this application.

What is claimed is:

1. A wireless communications apparatus, comprising:
   at least one memory and at least one processor, wherein the at least one memory is coupled to the at least one processor, and the at least one memory is configured to store one or more computer executable instructions, the at least one processor is configured to invoke the one or more computer executable instructions to make the wireless communications apparatus perform operations comprising:
   generating a spatial reuse limitation indication, wherein the spatial reuse limitation indication indicates whether only a node in a spatial reuse group is allowed for spatial reuse; and
   sending the spatial reuse limitation indication.

2. The wireless communications apparatus according to claim 1, wherein:
   a first value of the spatial reuse limitation indication indicates that only the node in a spatial reuse group is allowed for spatial reuse; or
   a second value of the spatial reuse limitation indication indicates a node allowed for spatial reuse is not limited by the spatial reuse group.

3. The wireless communications apparatus according to claim 1, wherein the operations comprise: sending a spatial reuse group indication, wherein the spatial reuse group indication indicates the spatial reuse group, and the spatial reuse group comprises one or more basic service sets.

4. The wireless communications apparatus according to claim 3, wherein the spatial reuse group indication comprises at least one of the following: an identifier of the one or more basic service sets, a color of the one or more basic service sets, or a bitmap corresponding to the one or more basic service sets.

5. The wireless communications apparatus according to claim 3, wherein the one or more basic service sets are comprised in one or more basic service set groups, and the spatial reuse group indication comprises at least one of the following:
   a group identifier of the one or more basic service set groups, or a bitmap corresponding to the one or more basic service set groups.

6. The wireless communications apparatus according to claim 3, wherein the spatial reuse group indication is carried in a trigger frame, the spatial reuse group indication is carried in a padding part of the trigger frame, the padding part further comprises a special association identifier, and the special association identifier comprises an association identifier that is not allocated by a first access point to a station associated with the first access point.

7. A wireless communications apparatus, comprising:
   at least one memory and at least one processor, wherein the at least one memory is coupled to the at least one processor, and the at least one memory is configured to store one or more computer executable instructions, the at least one processor is configured to invoke the one or more computer executable instructions to perform operations comprising:
   receiving a spatial reuse limitation indication, wherein the spatial reuse limitation indication indicates whether only a node in a spatial reuse group is allowed for spatial reuse; and
   determining, based on the spatial reuse limitation indication, whether to perform spatial reuse based on a spatial reuse parameter.

8. The wireless communications apparatus according to claim 7, wherein:
   a first value of the spatial reuse limitation indication indicates that only the node in the spatial reuse group is allowed for spatial reuse;
   or a second value of the spatial reuse limitation indication indicates that a node allowed for spatial reuse is not limited by the spatial reuse group.

9. The wireless communications apparatus according to claim 1, wherein the operations comprise: receiving a spatial reuse group indication, wherein the spatial reuse group indication indicates the spatial reuse group, and the spatial reuse group comprises one or more basic service sets.

10. The wireless communications apparatus according to claim 9, wherein the spatial reuse group indication comprises at least one of the following: an identifier of the one or more basic service sets, a color of the one or more basic service sets, or a bitmap corresponding to the one or more basic service sets.

11. The wireless communications apparatus according to claim 9, wherein the one or more basic service sets are comprised in one or more basic service set groups, and the spatial reuse group indication comprises at least one of the following: a group identifier of the one or more basic service set groups, or a bitmap corresponding to the one or more basic service set groups.

12. The wireless communications apparatus according to claim 7, wherein the spatial reuse limitation indication come from a first access point in a basic service set different from a basic service set in which the wireless communications apparatus is located, and wherein determining, based on the spatial reuse limitation indication, whether to perform spatial reuse based on the spatial reuse parameter comprises:
   determining that the spatial reuse limitation indication is a first value and that the basic service set to which the wireless communications apparatus belongs is comprised in the one or more basic service sets; or
   determining that the spatial reuse limitation indication is a second value and performing spatial reuse based on the spatial reuse parameter.

13. The wireless communications apparatus according to claim 12, wherein the operations comprise:
   determining that the basic service set to which the wireless communications apparatus belongs is comprised in the one or more basic service sets and performing spatial reuse based on the spatial reuse parameter.

14. The wireless communications apparatus according to claim 9, wherein the spatial reuse group indication is carried in a trigger frame, the spatial reuse group indication is carried in a padding part of the trigger frame, the padding part comprises a special association identifier, and the special association identifier comprises an association identifier that is not allocated by a first access point to an apparatus associated with the first access point.

15. A method, comprising:
generating, by a first access point, a spatial reuse limitation indication, wherein the spatial reuse limitation indication indicates whether only a node in a spatial reuse group is allowed for spatial reuse; and
sending, by the first access point, the spatial reuse limitation indication.

16. The method according to claim 15, wherein:
a first value of the spatial reuse limitation indication indicates that only the node in a spatial reuse group is allowed for spatial reuse; or
a second value of the spatial reuse limitation indication indicates that a node allowed for spatial reuse is not limited by the spatial reuse group.

17. The method according to claim 15, wherein the method further comprises: sending a spatial reuse group indication, wherein the spatial reuse group indication indicates the spatial reuse group, and the spatial reuse group comprises one or more basic service sets.

18. The method according to claim 17, wherein the spatial reuse group indication comprises at least one of the following: an identifier of the one or more basic service sets, a color of the one or more basic service sets, or a bitmap corresponding to the one or more basic service sets.

19. The method according to claim 17, wherein the spatial reuse group indication is carried in a trigger frame, the spatial reuse group indication is carried in a padding part of the trigger frame, the padding part further comprises a special association identifier, and the special association identifier comprises an association identifier that is not allocated by the first access point to a station associated with the first access point.

20. The method according to claim 17, wherein the one or more basic service sets are comprised in one or more basic service set groups, and the spatial reuse group indication comprises at least one of the following:
a group identifier of the one or more basic service set groups, or a bitmap corresponding to the one or more basic service set groups.

* * * * *